United States Patent
Lipniarski

(10) Patent No.: US 7,526,841 B2
(45) Date of Patent: May 5, 2009

(54) INDENTED FEMALE BLOW-MOLDED CONNECTOR AND MALE CONNECTOR AND METHOD

(75) Inventor: David J. Lipniarski, North Tonawanda, NY (US)

(73) Assignee: Confer Plastics, Inc., North Tonawanda, NY (US)

( * ) Notice: Subject to any disclaimer, the term of this patent is extended or adjusted under 35 U.S.C. 154(b) by 20 days.

(21) Appl. No.: 11/893,272

(22) Filed: Aug. 15, 2007

(65) Prior Publication Data

US 2008/0047113 A1  Feb. 28, 2008

Related U.S. Application Data

(60) Division of application No. 10/996,950, filed on Nov. 24, 2004, now Pat. No. 7,275,289, which is a continuation-in-part of application No. 10/314,672, filed on Dec. 9, 2002, now abandoned.

(51) Int. Cl.
*F16B 21/06* (2006.01)
*F16B 21/07* (2006.01)
*F16B 12/48* (2006.01)
*A47B 47/04* (2006.01)

(52) U.S. Cl. ............... 24/297; 24/DIG. 60; 108/157.17; 108/158.12; 312/263; 312/111; 312/140; 403/397; 403/DIG. 11

(58) Field of Classification Search ............... 24/297, 24/295, 293, 294, DIG. 43, 44, 45, 50, 52, 24/60; 403/DIG. 11–13, 409.1, 292, 381, 403/DIG. 14; 312/263, 111, 140; 108/157.17, 108/158.12

See application file for complete search history.

(56) References Cited

U.S. PATENT DOCUMENTS

| 2,116,444 A | 5/1938 | Maier |
| 2,946,612 A | 7/1960 | Ahlgren |
| 3,395,642 A | 8/1968 | Foster et al. |
| 3,674,295 A | 7/1972 | Padivani |
| 4,312,614 A | 1/1982 | Palmer et al. |

(Continued)

FOREIGN PATENT DOCUMENTS

JP  2002-337837  11/2002

*Primary Examiner*—Robert J Sandy
(74) *Attorney, Agent, or Firm*—Roach Brown McCarthy & Gruber, P.C.; Kevin D. McCarthy

(57) ABSTRACT

A device and method for forming an indented female connector where the dimension of the indented female connector provides for removing a male molding component without damaging a set of internal ribs formed inside the female connector. A structure comprising an indented female blow-molded connector having a first wall having a top surface and a thickness, with the first wall surrounding an opening. At least one inner wall extends substantially perpendicular to the first wall and borders the opening. At least one rib is formed in the inner wall. A bottom wall is joined to the inner wall and the distance from the rib to the top surface is greater than the thickness of the first wall. The structure further comprising a male connector having a contact edge that, when positioned inside the indented female blow-molded connector, engage the at least one rib, such that the male connector and indented female blow-molded connector are releaseably joinable with one another. Structures can be made that use the indented female blow molded connectors and male connectors.

9 Claims, 28 Drawing Sheets

U.S. PATENT DOCUMENTS

| | | |
|---|---|---|
| 4,611,964 A | 9/1986 | Schlein |
| 4,715,095 A * | 12/1987 | Takahashi .................... 24/453 |
| 4,716,633 A * | 1/1988 | Rizo ........................... 24/453 |
| 4,726,722 A * | 2/1988 | Wollar ......................... 411/32 |
| 4,803,036 A | 2/1989 | Maruhashi et al. |
| 4,811,855 A | 3/1989 | Bergstrom et al. |
| 5,193,961 A * | 3/1993 | Hoyle et al. ................. 411/553 |
| 5,222,852 A * | 6/1993 | Snyder ....................... 411/553 |
| 5,533,237 A * | 7/1996 | Higgins ....................... 24/289 |
| 5,718,549 A * | 2/1998 | Noda et al. .................. 411/553 |
| 5,775,860 A * | 7/1998 | Meyer .......................... 411/46 |
| 6,132,154 A | 10/2000 | Easter |
| 6,145,173 A | 11/2000 | Suzuki et al. |
| 6,412,153 B1 | 7/2002 | Khachadourian et al. |
| 6,481,943 B2 * | 11/2002 | Coudrais et al. .............. 411/55 |
| 6,601,271 B1 | 8/2003 | Sommerfeld et al. |

* cited by examiner

INDENTED FEMALE BLOW-MOLDED CONNECTOR AND MALE CONNECTOR AND METHOD

BENEFIT CLAIM OF AN EARLIER FILED APPLICATION

This application is a divisional application of U.S. patent application Ser. No. 10/996,950 filed on Nov. 24, 2004 now U.S. Pat. No. 7,275,289 which claims priority to a continuation-in-part patent application of patent application Ser. No. 10/314,672, filed Dec. 9, 2002 now abandoned to Lipniarski for an Indented Female Blow-Molded Connector.

FIELD OF INVENTION

The present indented female blow-molded connector and male connector relate generally to the field of molded plastic parts, and specifically relate to blow-molding a thermoplastic material into the shape of an indented female connector and the shape of a male connector such that the male connector can be joined to the indented female blow-molded connector.

BACKGROUND OF THE INVENTION

Blow molding of plastics to form hollow shapes such as bottles, containers and the like is well known to those having ordinary skill in the art. Some shapes, however, are difficult to mold into a hollow container with a blow molding process. An example of a shape that is difficult to mold is an indented female connector having a set of internal ribs for engaging with a male connector. Accordingly, there is a need for an improved device for molding an indented female connector as part of a hollow object.

Additionally, there is a need for hollow molded objects that can be assembled into sturdy durable structures, such as chairs, tables, stools, walls, and the like, without the need for extra components. There is a need for these structures to be sturdy, so that they can withstand loads imposed on them without breaking or collapsing. There is also a need for the hollow molded objects to be formed such that they can be repeatedly manually joined and released from one another without the use of tools, wrenches, additional components, hammers, screw drivers, and/or power equipment.

SUMMARY

A male mold component is provided and is inserted into a first hollow molded object mold, to thus forming the indented female blow-molded connector in the first hollow molded object. The male mold component can be removed from the first hollow molded object without damaging ribs formed in the indented female blow-molded connector.

After removal of the male mold component, the first hollow molded object has the indented female blow-molded connector formed in a side thereof. There is also a second hollow molded object that has a male side with a male connector extending from the male side. A structure is made from the first hollow molded object and the second hollow molded object when the male connector is moved into and joined to the indented female blow-molded connector.

The indented female blow-molded connector (hereinafter female blow molded connector) has an upper or first wall having a top surface and a thickness, the first wall surrounds an opening. There is at least one inner wall that extends substantially perpendicular to the first wall and that borders the opening. There is also at least one rib formed in the inner wall, and a bottom wall is joined to the inner wall. The bottom wall can be curved. The rib, in an embodiment, can be formed from a pair of rib walls that converge at an approximately forty-five degree angle relative to the inner wall. The distance from the rib to the top surface is greater than the thickness of the first wall.

When the male connector is moved into and positioned internal to the indented female connector, the male connector becomes robustly joined to the indented female connector. This is possible, because the male connector has a contact edge that makes an interference type fit with the at least one rib of the indented female connector. The indented female connector and male connector can be repeatedly manually joined and separated.

The indented female connector and male connector can be used to create of plurality of sturdy, stable structures. The structures can be manually assembled and disassembled without the need for tools, other parts and components, or equipment. The structures that can be formed include stools, tables, chairs, walls, and the like.

BRIEF DESCRIPTION OF THE DRAWINGS

The indented female blow-molded connector and male connector are illustrated in the figures. Like reference characters designate the same or similar parts throughout the figures.

DETAILED DESCRIPTION

Figure 2:
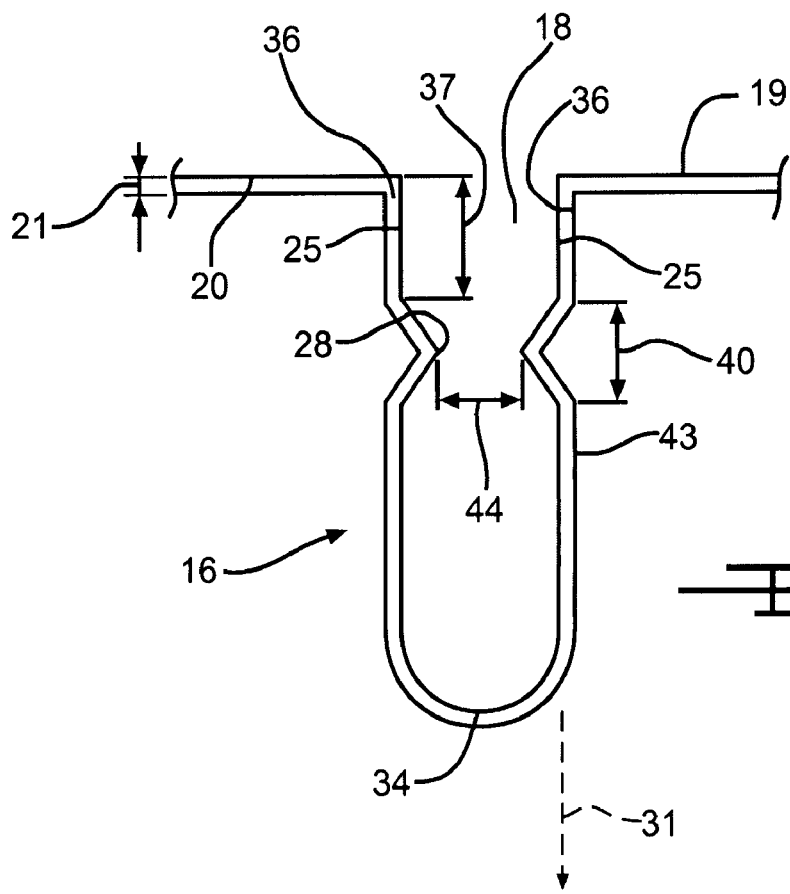
FIG. 2 is a sectional side elevational view of the indented female blow-molded connector.
Figure 1:
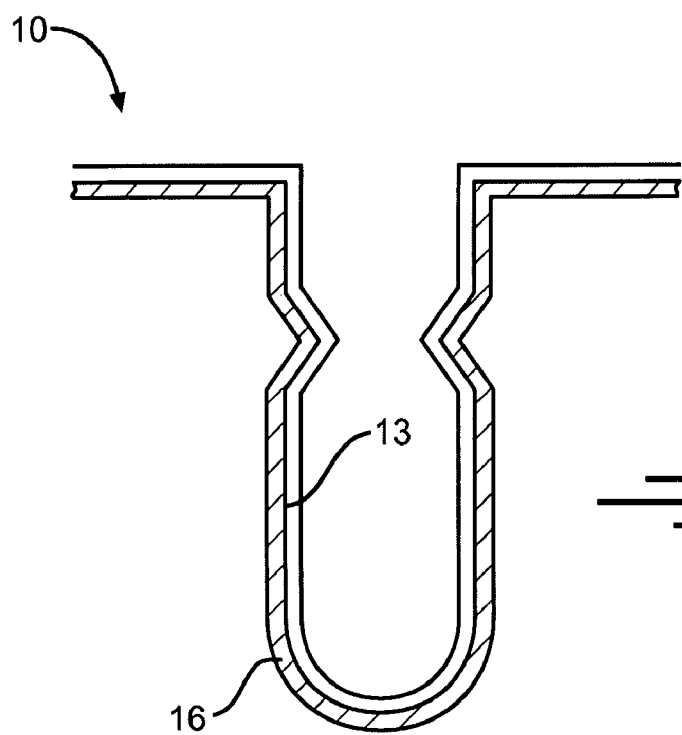
FIG. 1 is a sectional side elevational view of the male mold component positioned inside a portion of the object to be molded.
Figure 3:
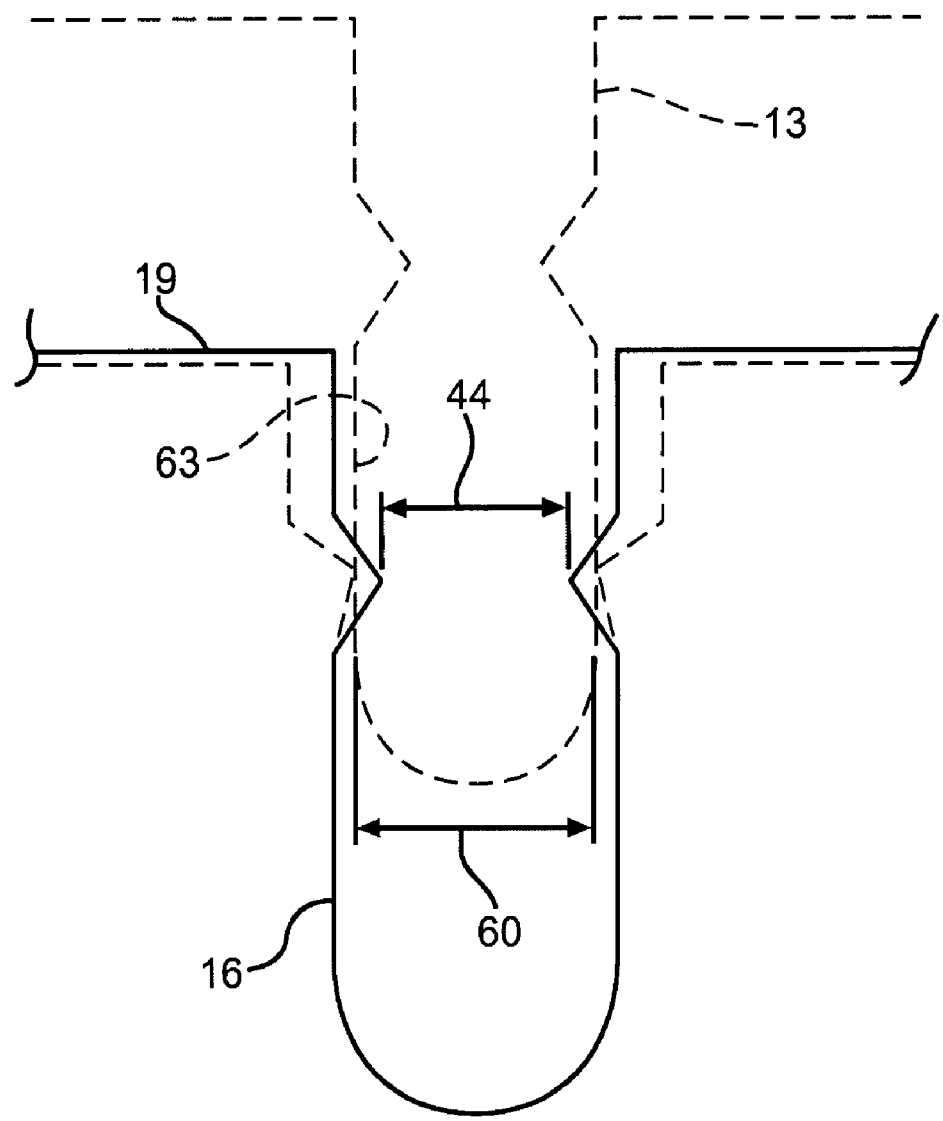
FIG. 3 is a sectional side elevational view showing the mold component in broken lines as it is being removed from the indented female blow-molded connector.

Referring generally to FIGS. 1-3 and initially to FIG. 1, a portion of a first hollow molded object 10 is shown in a sectional side view. The first hollow molded object 10 comprises an indented female blow-molded connector 16, hereinafter indented female connector 16, as shown in FIGS. 2 and 4-6. The first hollow object 10 is formed from thermoplastic materials by blow molding techniques known to those of ordinary skill in the art.

As shown in FIGS. 1 and 3 a male mold component 13 is inserted into the mold to form the indented female connector 16. Once the female connector 16 has been molded, the male mold component 13 is removed from the mold as described hereinafter. It is noted that after the male mold component 13 has been removed, a recess or opening 18 is defined in the first hollow molded object 10, as shown in FIGS. 2 and 4-6.

Figure 5:
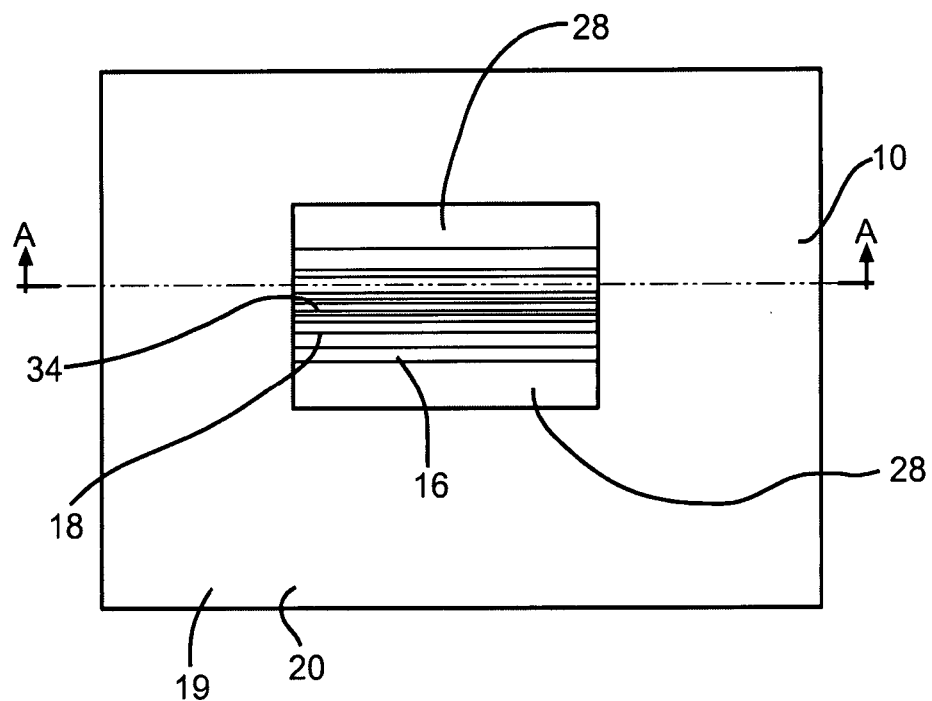
FIG. 5 is a top plan view of the first hollow molded object showing the indented female blow-molded connector.
Figure 32:
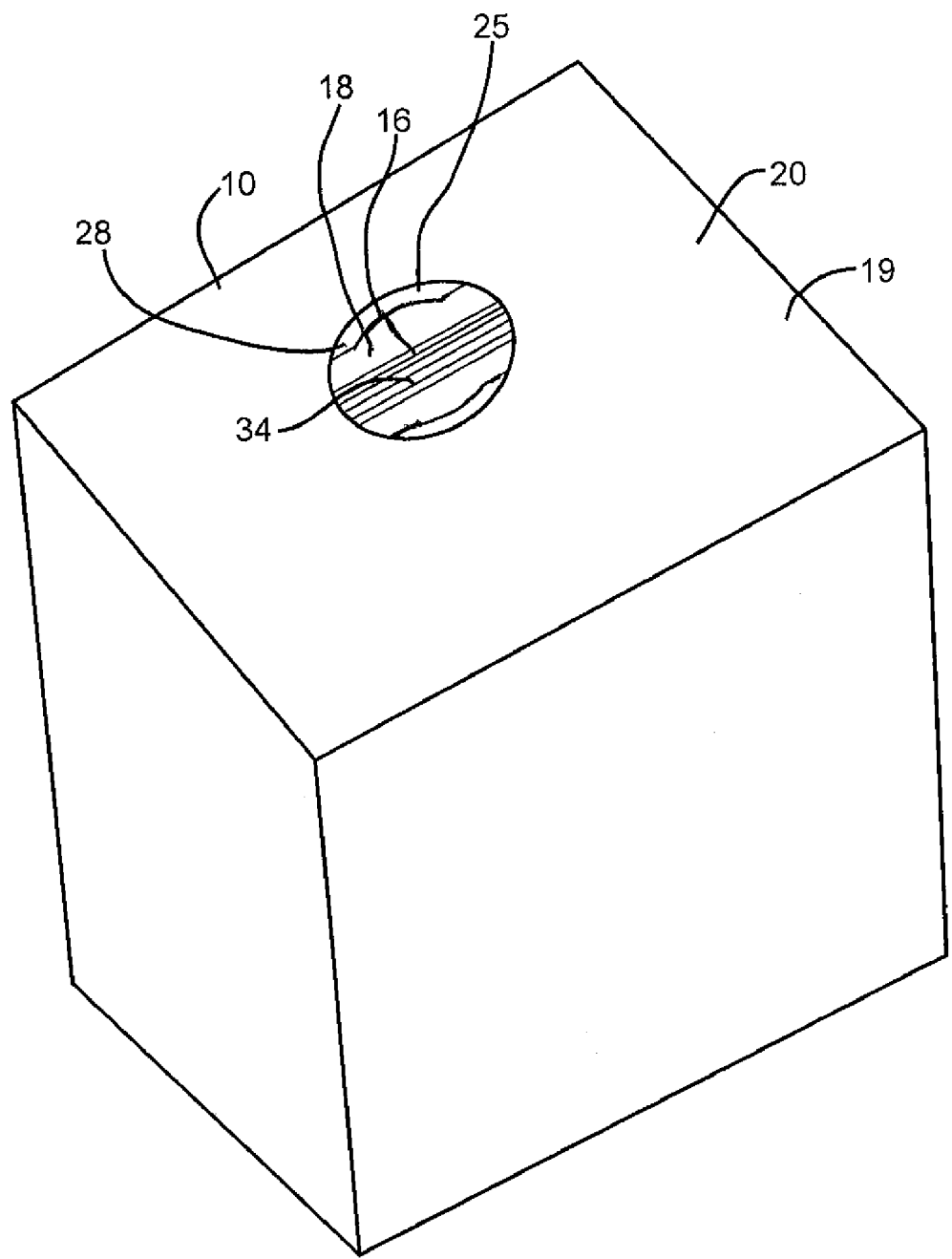
FIG. 32 is an alternative embodiment of FIG. 4.

Referring to FIG. 2, the indented female connector 16 is surrounded by a surface 19. The surface 19 is formed on an upper or first wall 20 that has a thickness indicated at 21. The surface 19 is disposed substantially perpendicular to a set of inside walls 25 extending inward toward a rib 28 that is integrally formed in the inside walls 25 during the molding process. The rib 28 is comprises a pair of converging rib walls 29. Depending on the shape of the opening, the rib 28 may be formed on some or all of the inside walls 25. For a circular opening as illustrated at FIG. 32, the rib 28 may be formed in an annular configuration. For a rectangular opening the rib 28 may extend only along the opposed major lengths of the rectangle, as shown in FIG. 5.

The rib 28 may extend from the inner wall inward at an angle of approximately forty-five degrees. As shown in FIGS. 2 and 5, there is a pair of ribs 28 facing each other and extending inward at approximately a forty-five degree angle from an axis 31 parallel to the inside wall 25. With reference to the orientation of FIG. 2, the side walls 25 may continue downward and join by means of a section 34 disposed at the portion of the female indented connector 16 positioned farthest from the surface 19. Although the section 34 is curved in the drawings, the section 34 may be formed in other shapes as well. For example, the section 34 may comprise a rectangular shape in other embodiments.

Between the top of surface 19 and the rib 28 is a flex section 36 having a dimension 37, as shown in FIG. 2. The distance along the rib is a locking surface 40, and the portion below the rib 28 is a receiving surface 43. The opening between opposed ribs 28 has a dimension 44 that will be described presently.

Turning to FIG. 3, after the blow molding process is completed, the male mold component 13 is removed from the indented female connector 16 by pulling it in a direction substantially perpendicular to top surface 19. The opening or recess 18 in the first hollow molded object 10 is narrowest at the position between the ribs 28, and this is indicated in FIG. 2 as dimension 44. When the male mold component 13 is removed from the formed indented female connector 16 as shown in FIG. 3, the ribs 28 are forced on, and as a result have to bend or flex away from each other in order to accommodate the large diameter 60 of the lower portion 63 of the male mold component 13.

Returning to FIG. 2, it has been discovered that in order to form the ribs 28 and to successfully remove the male mold component 13 without damaging the ribs 28, a certain relationship between thickness 21 of the first wall 20 and the dimension 37 applies. If dimension 37 is greater than thickness 21, then the male mold component 13 can be removed without damaging the ribs 28. If dimension 37 is less than or equal to the thickness 21, the ribs 28 are typically destroyed when the male mold component 13 is removed.

Figure 4:
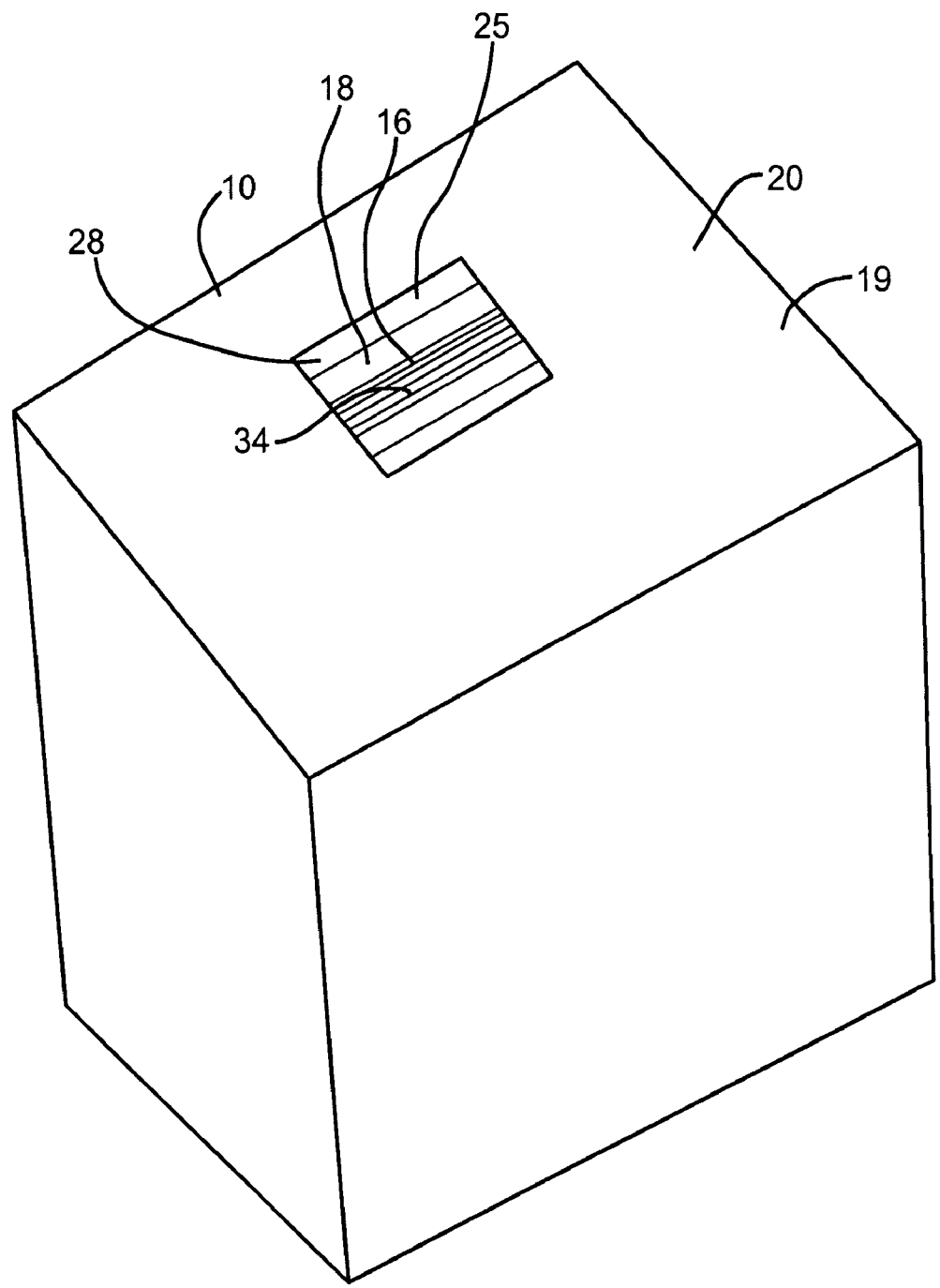
FIG. 4 is a perspective view of a first hollow molded object having an indented female blow-molded connector.
Figure 6:
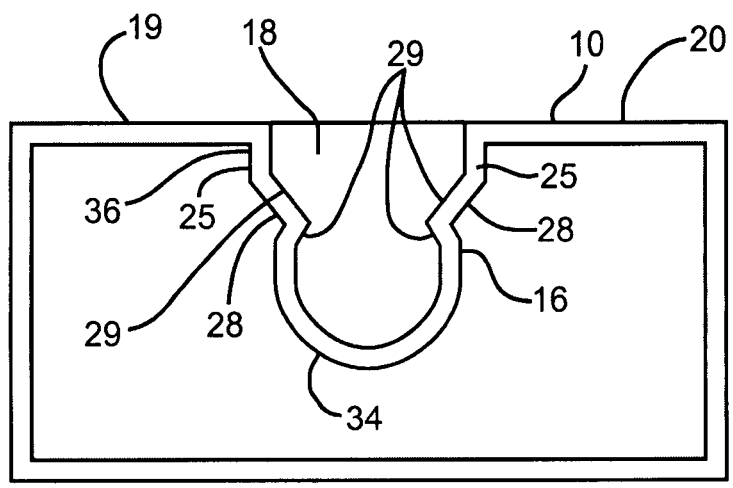
FIG. 6 is a sectional view taken along cut line A-A of the first hollow molded object showing the indented female blow-molded connector.
Figure 7:
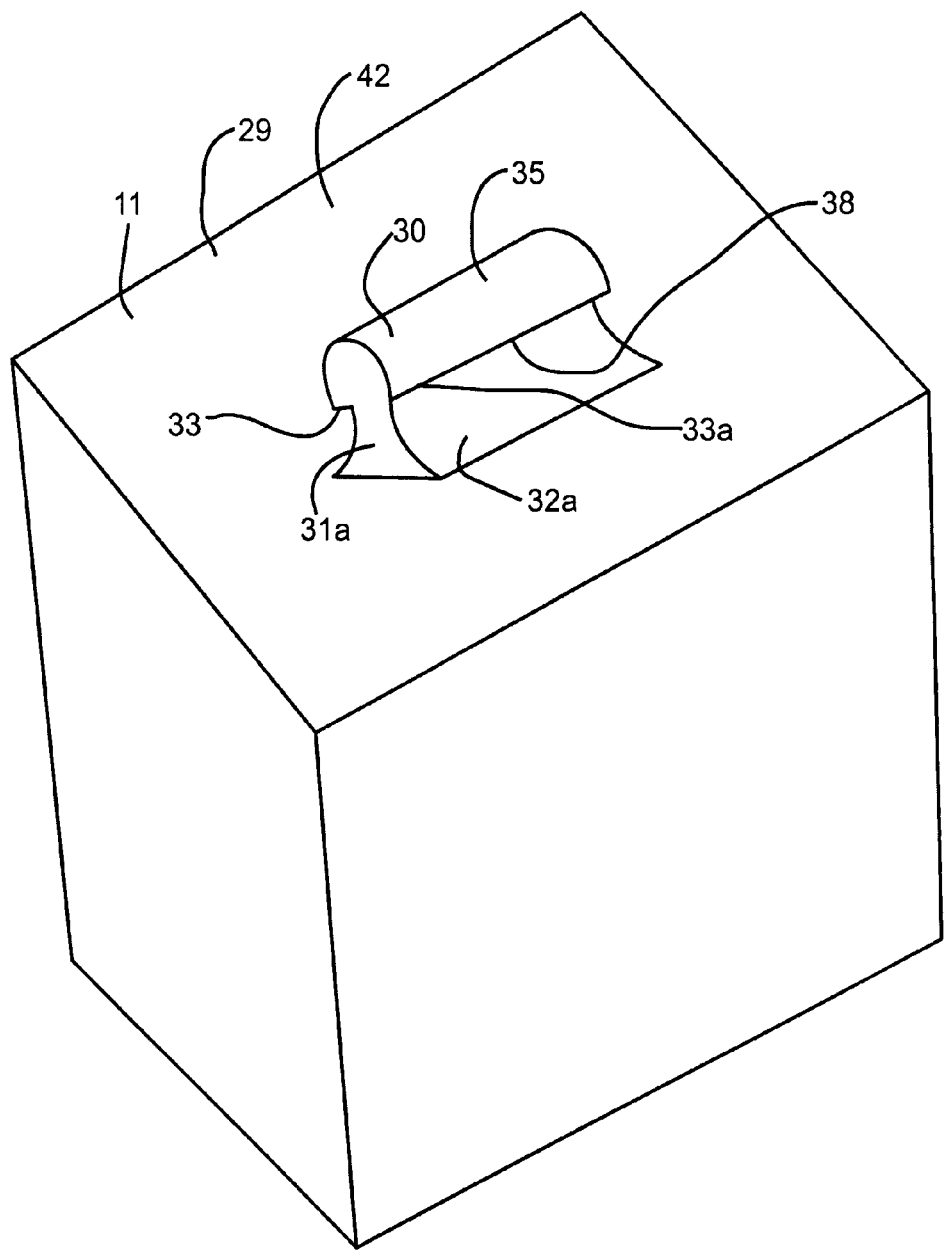
FIG. 7 is a perspective view of the second hollow molded object from which extends a male connector.
Figure 8:
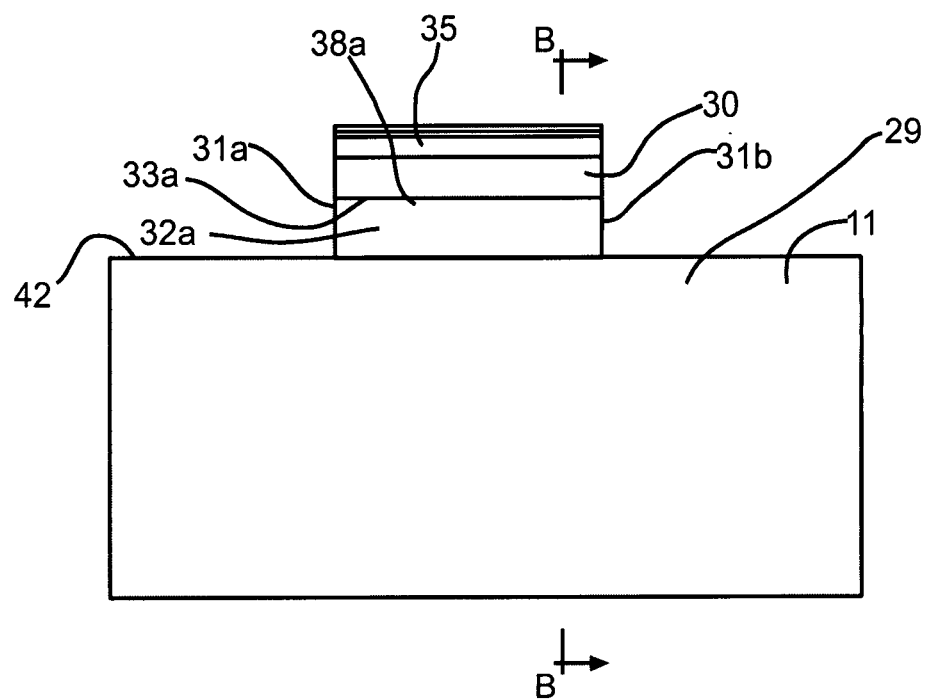
FIG. 8 is a front elevational view of the second hollow molded object showing the male connector.
Figure 9:
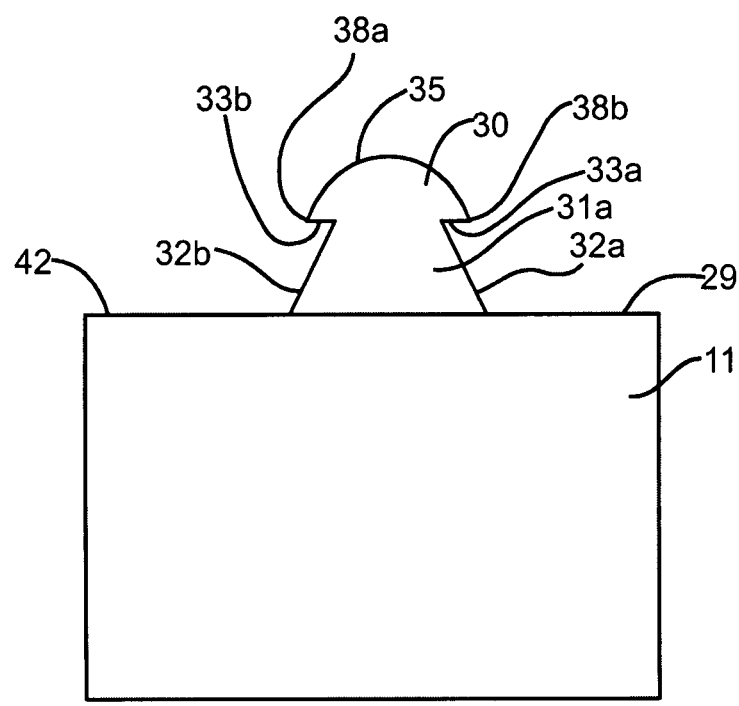
FIG. 9 is left elevational view of the second hollow molded object showing the male connector.
Figure 10:
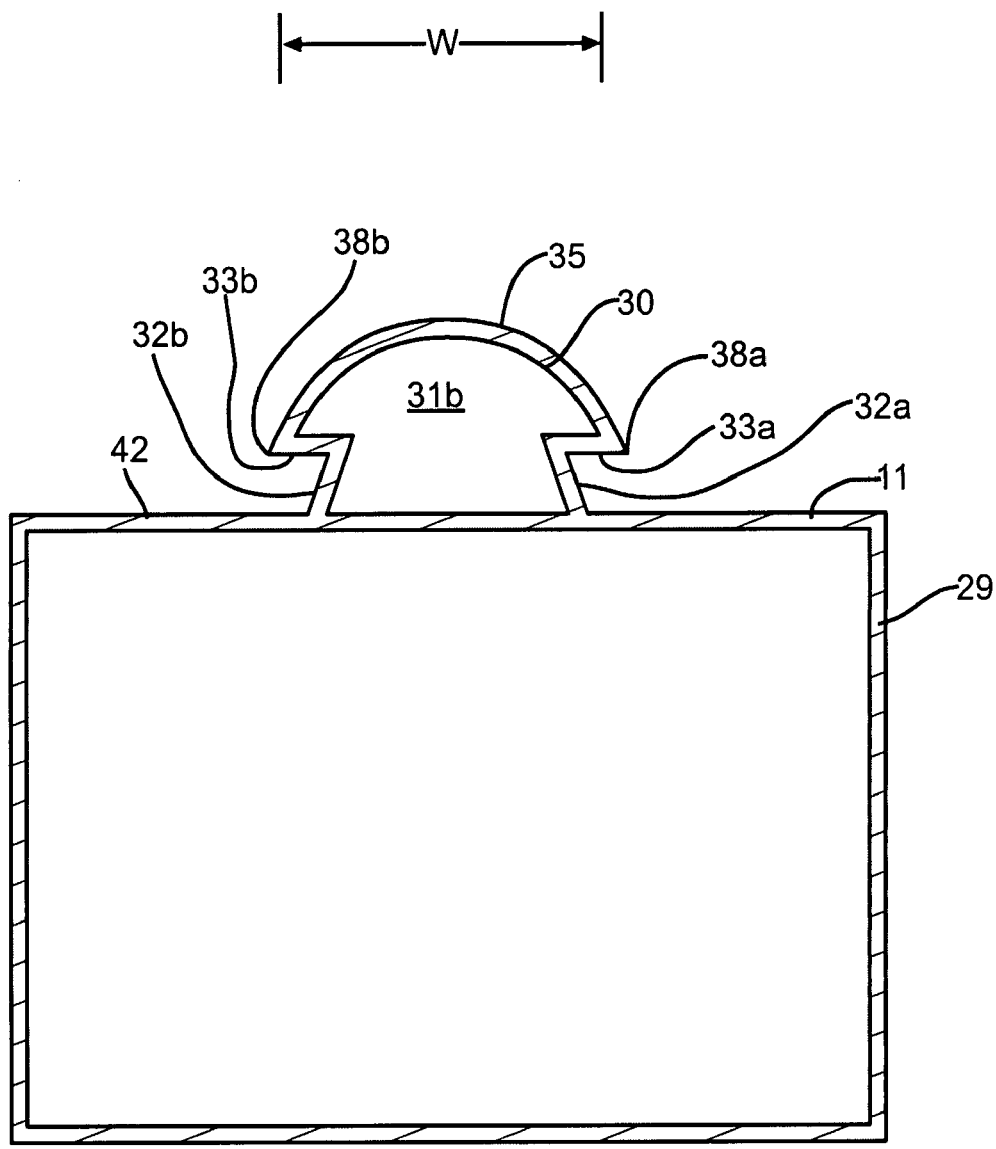
FIG. 10 is a sectional view of the second hollow molded object showing the male connector taken along cut line B-B.

FIG. 4 is a perspective view of the first hollow object 10 having a indented female connector 16 formed therein. FIG. 5 is a top plan view of the indented female connector 16 that shows the ribs 28. And, FIG. 6 is a sectional view taken along cut line A-A of FIG. 5 that shows the indented female connector 16 formed in the first hollow object 10.

A second hollow molded object 11 is provided as shown in FIGS. 7-10. The second hollow molded object 11 comprises a male side 42 and a male connector 30 that extends from the male side 42. It is noted that the second hollow object 11 is formed from thermoplastic materials by blow molding in a manner well known to those having ordinary skill in the art.

As shown in FIGS. 7-10, the male connector 30 comprises a first and second opposed walls 31a and 31b, respectively, that extend substantially perpendicular to the male side 42. Extending from the male side 42 between the first and second oppose walls, 31a, 31b, respectively, are first and second angled walls, 32a, 32b, respectively. The first angled wall 32a is joined with the first and second walls, 31a, 31b, respectively. And, the second angled wall 32b is joined with the first and second walls, 31a, 31b, respectively. A first contact wall 33a extends from the first angled wall 32a, and a second contact wall 33b extends from the second angled wall 32b.

A curved wall 35 is joined with and extends between the first and second contact walls 33a, 33b, respectively. The curved wall 35 and first contact wall 33a meet at a first edge 38a, and the curved wall 35 and the second contact wall 33b meet at a second edge 38b. The curved wall 35 is also joined with the first and second angled walls, 32a, 32b, respectively. The male connector 30 has a width designated W in FIG. 10. It is noted that in other embodiments the angled walls may be formed such that they are perpendicular to the male side 42 and perpendicular to the first and second contact walls 33a, 33b, respectively.

Figure 11:
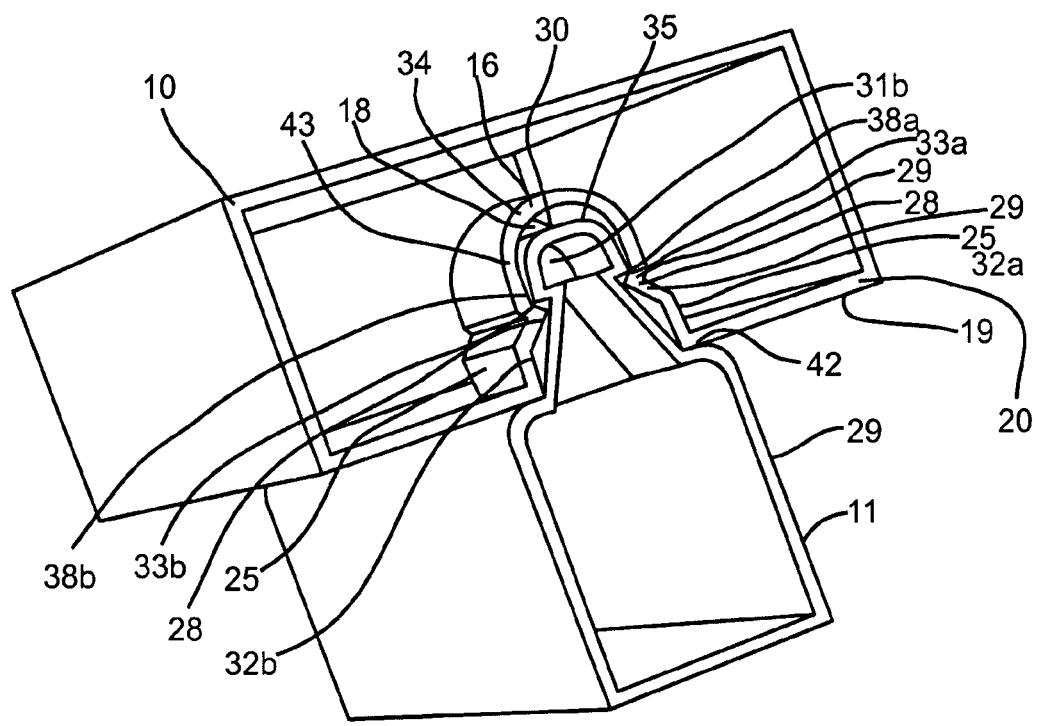
FIG. 11 is a perspective sectional view of the male connector and indented female blow-molded connector joined together.
Figure 12:
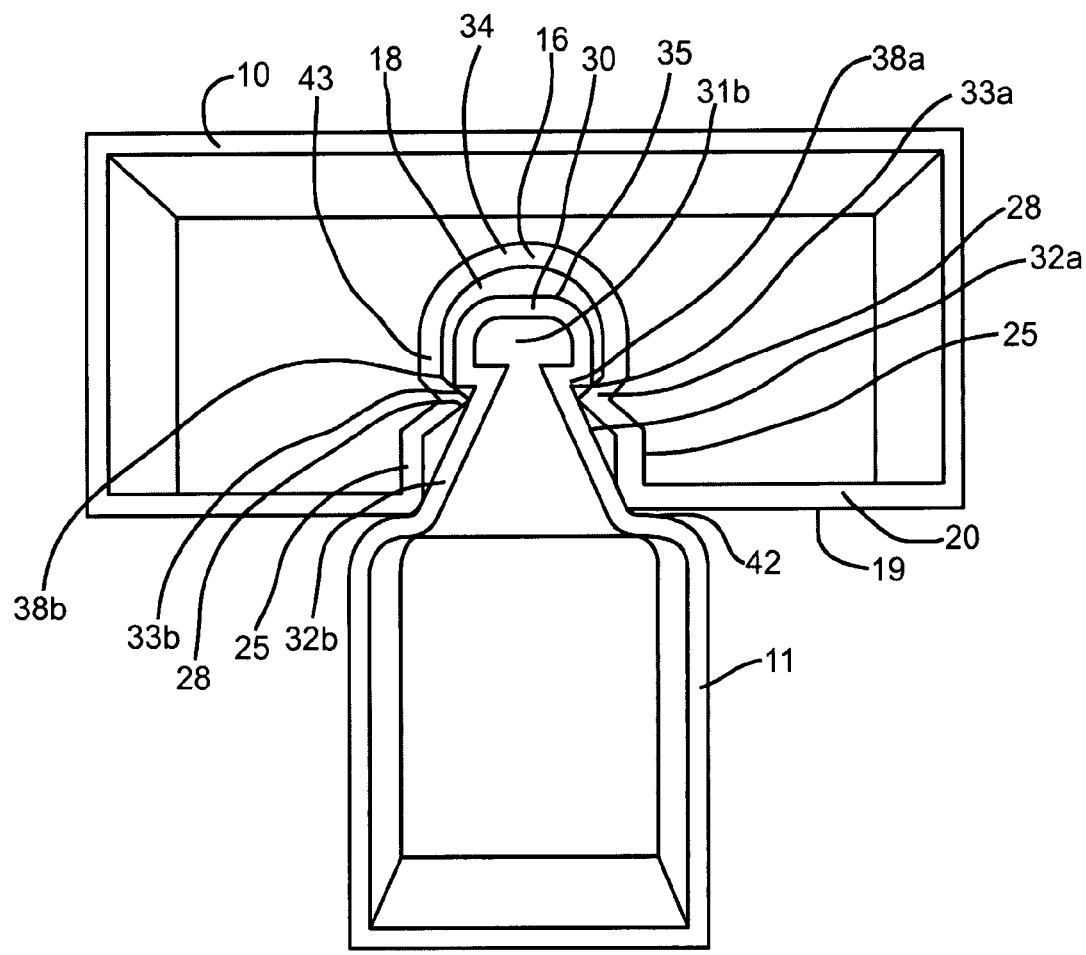
FIG. 12 is a sectional view of the male connector and indented female blow-molded connector joined together.
Figure 13:
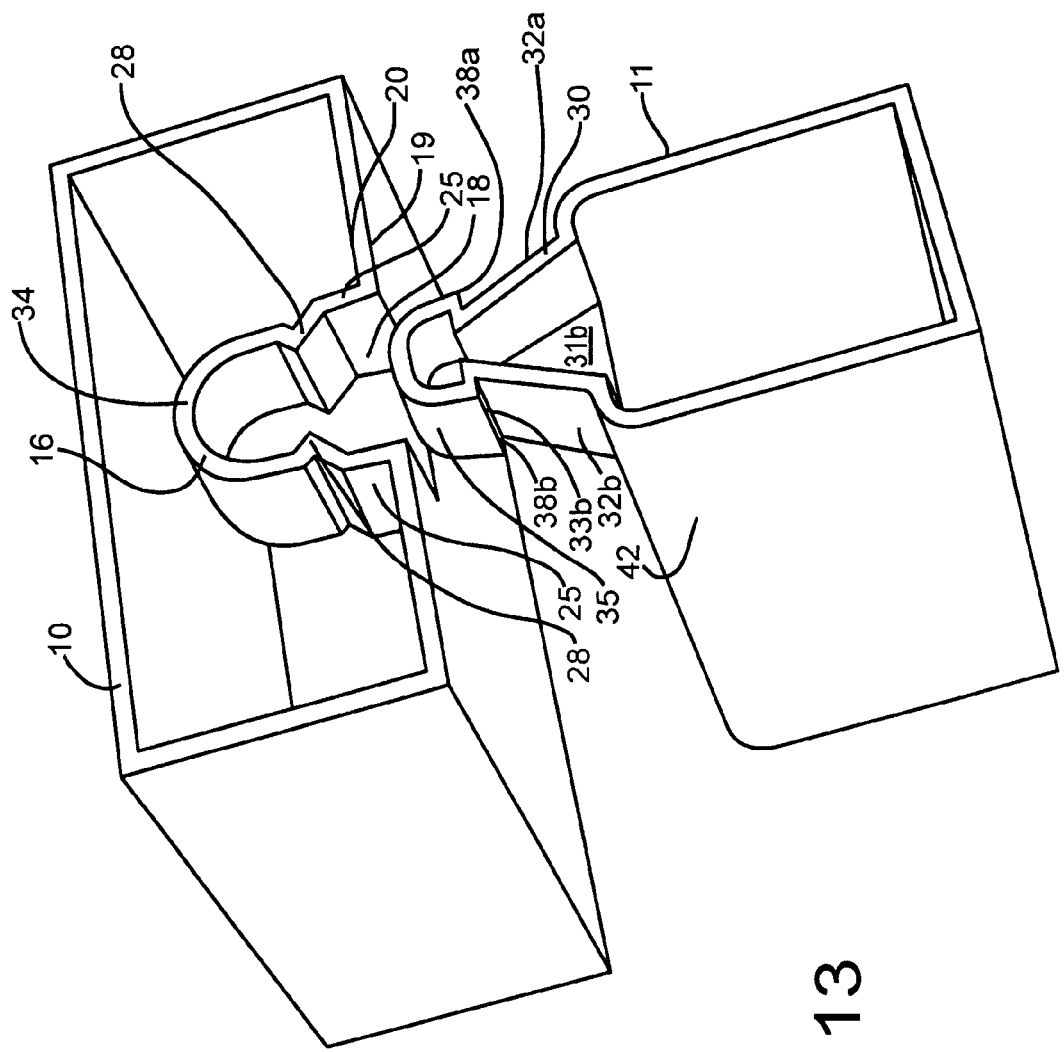
FIGS. 13-15 are perspective sectional views showing, in sequence, the introduction of the male connector into the indented female blow-molded connector.
Figure 14:
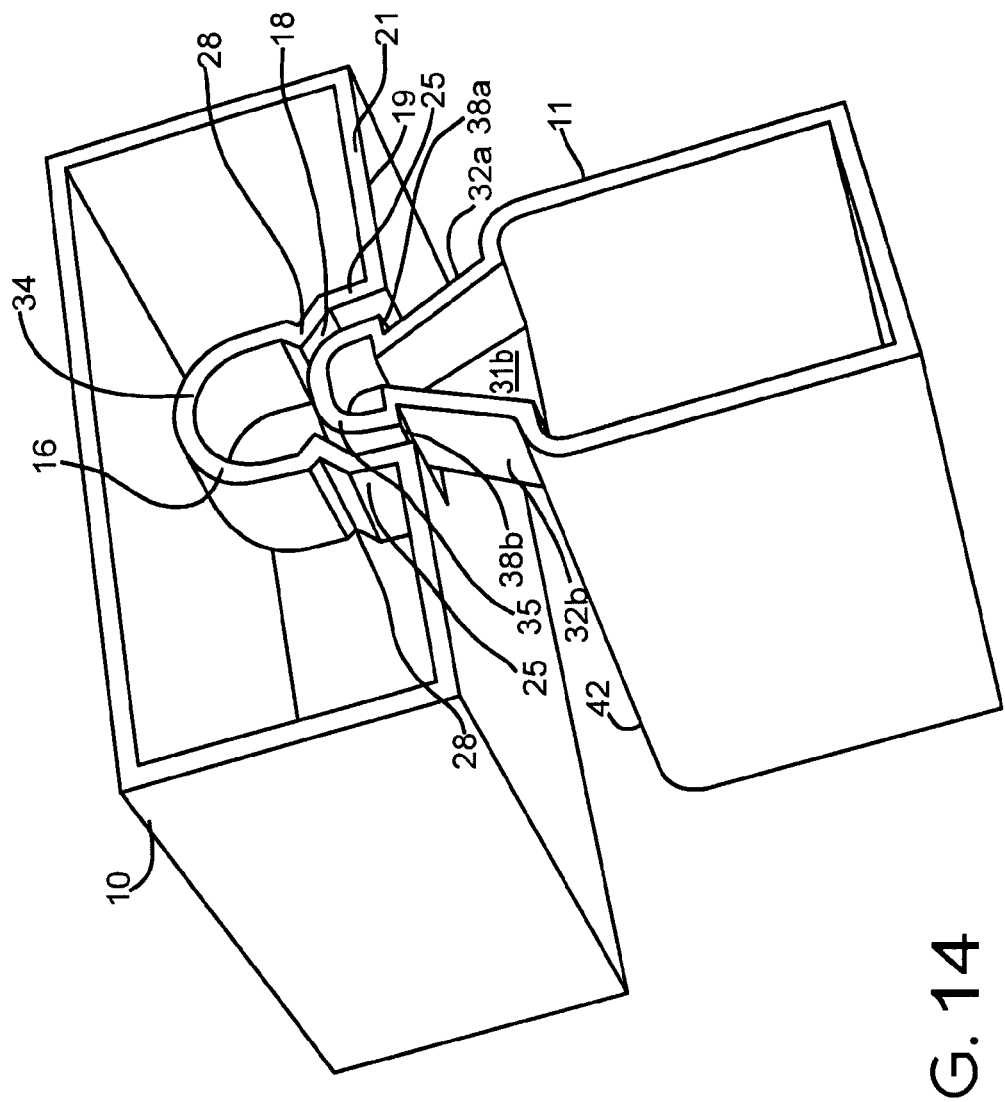
Figure 15:
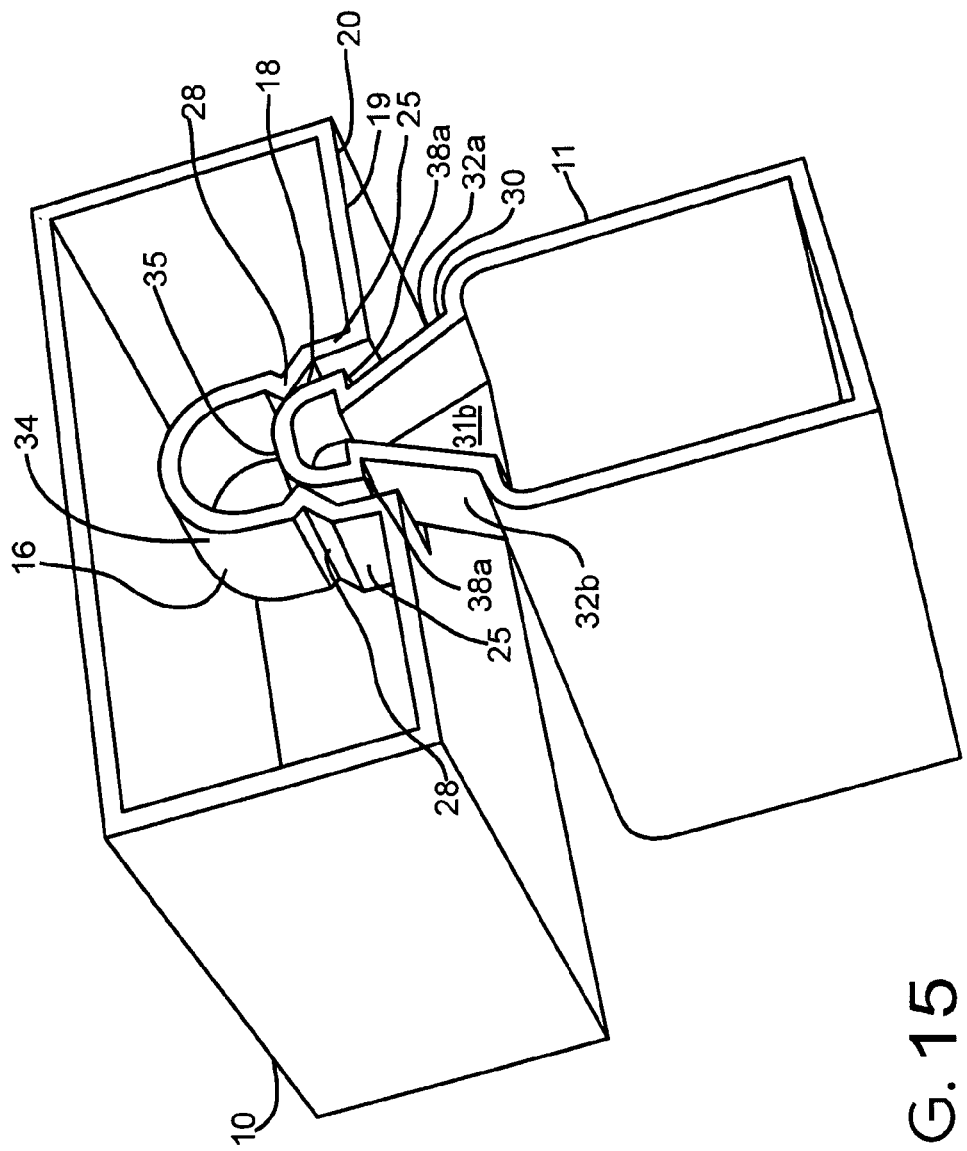

The above-described indented female connector 16 and the male connector 30 can be manually releasably joined to one another. FIGS. 13-15 show, in sequence, the male connector 30 as it is introduced into the indented female connector 16. The curved wall 35 contacts the ribs 28 that are a distance, designated dimension 44 in FIG. 2 apart from one another. Width, designated W of the curved wall 35 is greater than the distance between the ribs 28. As the curved wall 35 of the male connector 30 is introduced it contacts and forces on the ribs 28. In response, the ribs 28 expand and the curved wall 25 of the male connector 30 moves past the ribs 28. Afterward, the curved wall 35 is adjacent the section 34 of the indented female connector 16 as shown in FIGS. 11 and 12. It is noted that the above-described expansion is similar to the expansion of the ribs 28 shown in FIG. 3, showing the removal of the male mold component 13 from the indented female connector 16.

The male connector 30 is thus joined to the indented female connector 16. In particular, the first and second contact edges 38a, 38b, respectively, of the male connector 30 contact the ribs 28, thus joining or interlocking the male connector 30 to the indented female connector 16 with an interference-type fit. In this manner, the male connector 30 and indented female connector 16 are robustly joined to one another, such that there is a minimal amount of play or space for movement between them when they are so joined together. This advantageously allows for structures 46 that are sturdy and stable to be built from a plurality of first and second hollow molded objects, 10, 11, respectively, that have the above-described indented female connectors 16 and male connectors 30. As will be described presently, there are virtually a limitless number of useful structures 46 may be made from the indented female connector 16 and male connector 30.

Also, the male connector 30 and indented female connector 16 can be manually taken apart or disassembled without the use of tools, equipment, or other parts, pieces, or components. To separate or disassemble, manual force is applied to the male connector 30 and indented female connector 16 in opposite directions. During the separation process, the ribs 28 expand to allow the male component 30 to pass through the ribs 28, and the ribs 28 are not destroyed during the removal process. Advantageously, the male connector 30 and indented female connector 16 can be repeatedly joined and subsequently separated, such that structures 46 that employ the indented female connector 16 and male connector 30 can repeatedly assembled and disassembled.

Another advantage of the releasably joinable indented female connector 16 and male connector 30 is that one person can manually assemble and disassemble structures 46 without the need for other parts and components, without the need for any tools, and without the need for any separate fasteners. Advantageously, there is no possibility of small parts and pieces being lost or misplaced when the present male connector 30 and indented female connector 16 are used to form structures 46. It is noted that the male connector 30 and indented female connector 16 are durable and study. Thus, if a person uses a mallet or hammer made of, for example, rubber, plastic, wood, metal, and combinations thereof to pound the male connector 30 and indented female connector 16 together and/or apart, then the likelihood of the male connector 30 or indented female connector being damaged is low.

Figure 16:
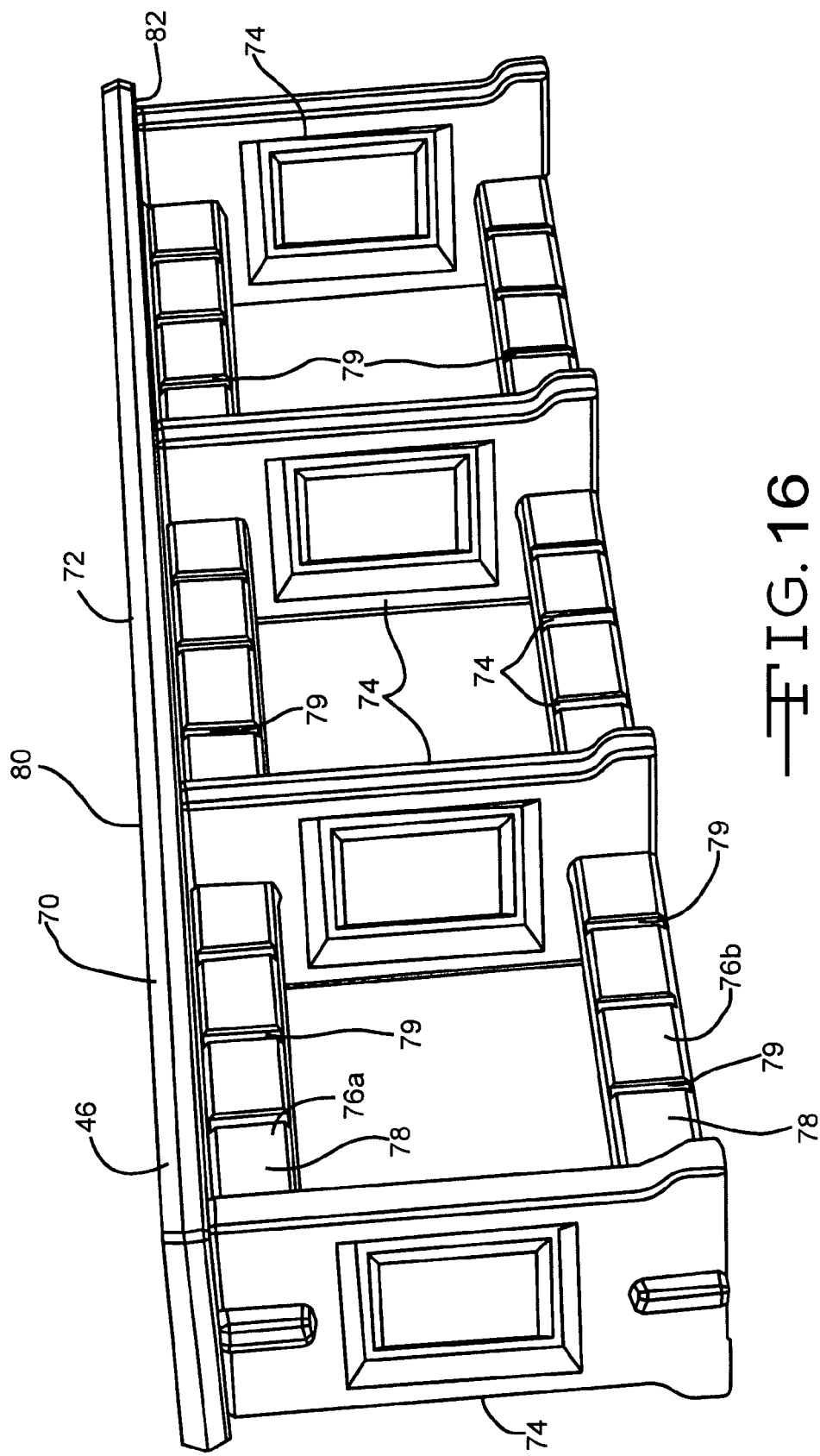
FIG. 16 is a perspective view of a structure held together with male connectors and indented female blow-molded connectors.
Figure 17:
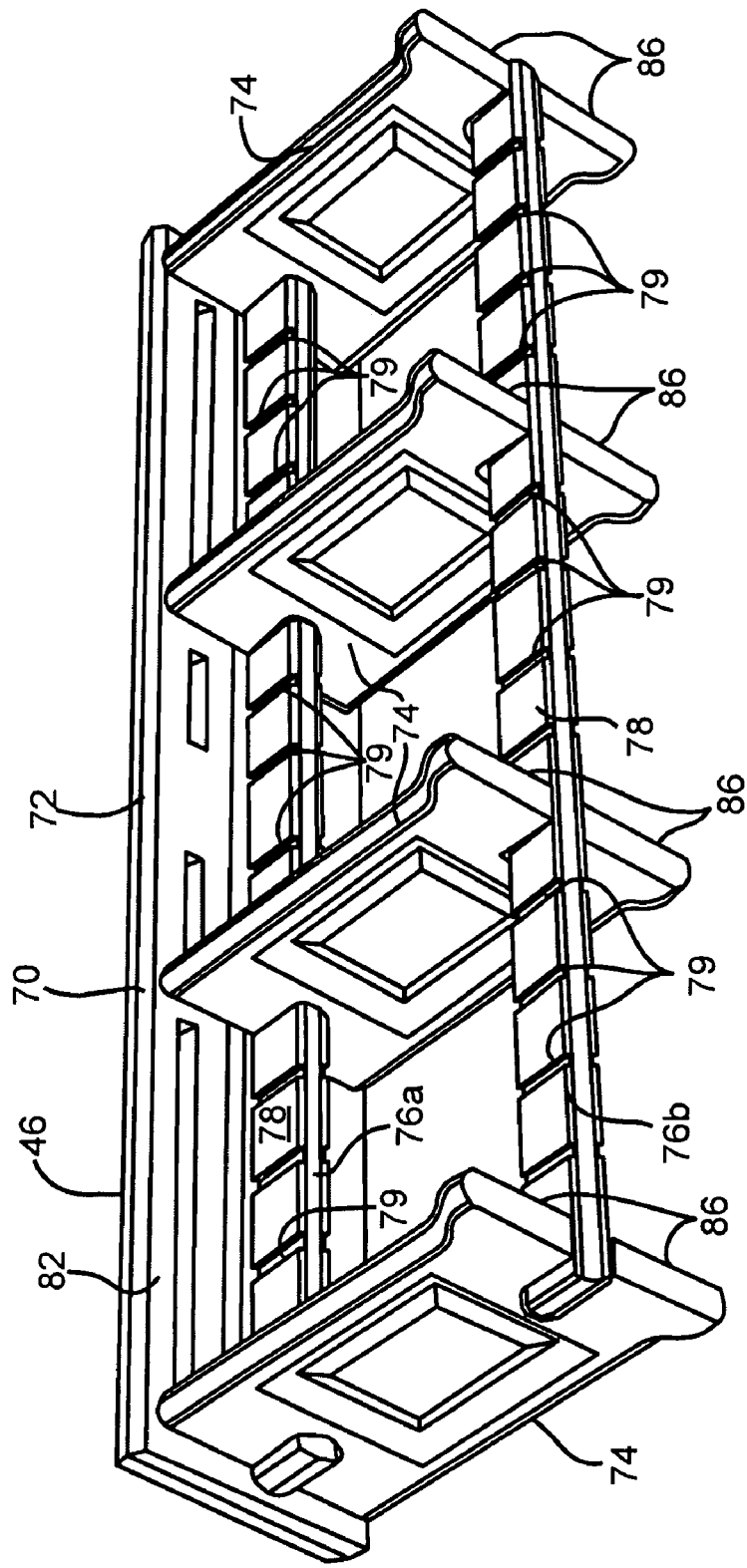
FIG. 17 is a bottom perspective view of the structure held together with male connectors and indented female blow-molded connectors.
Figure 18:
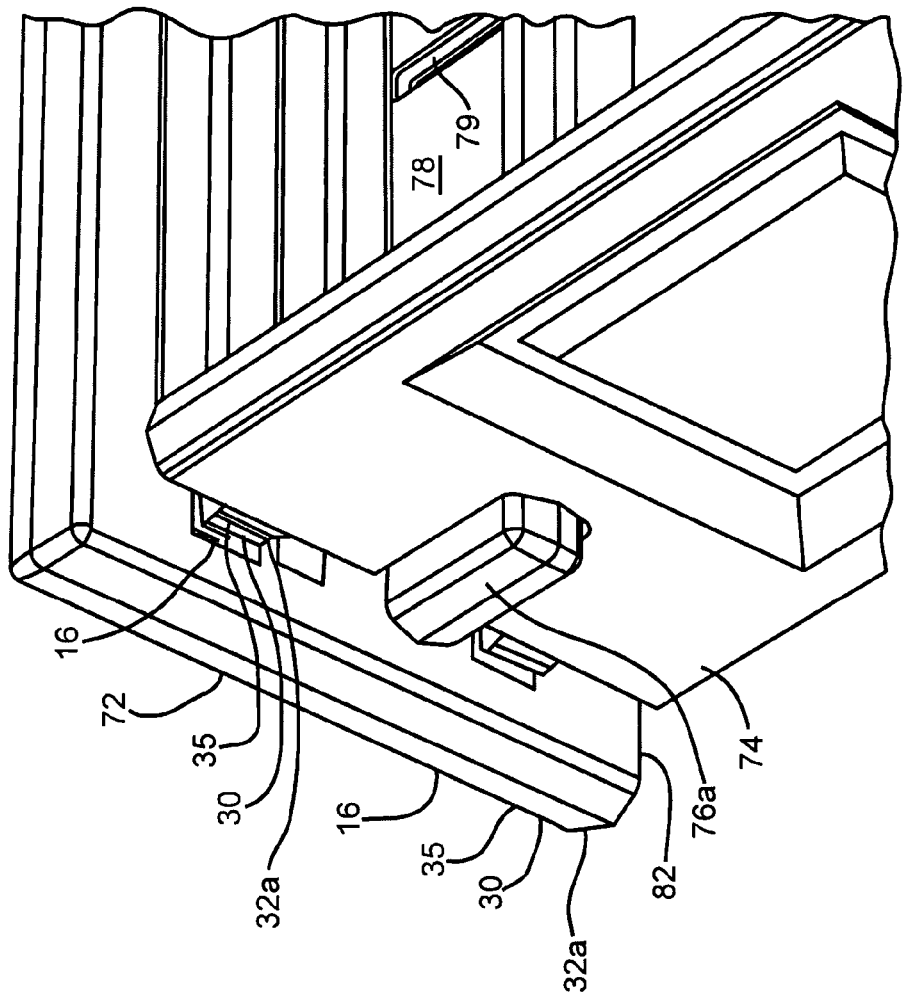
FIG. 18 is a perspective view, partly in section, showing a horizontal support member separated from a vertical support member.
Figure 19:
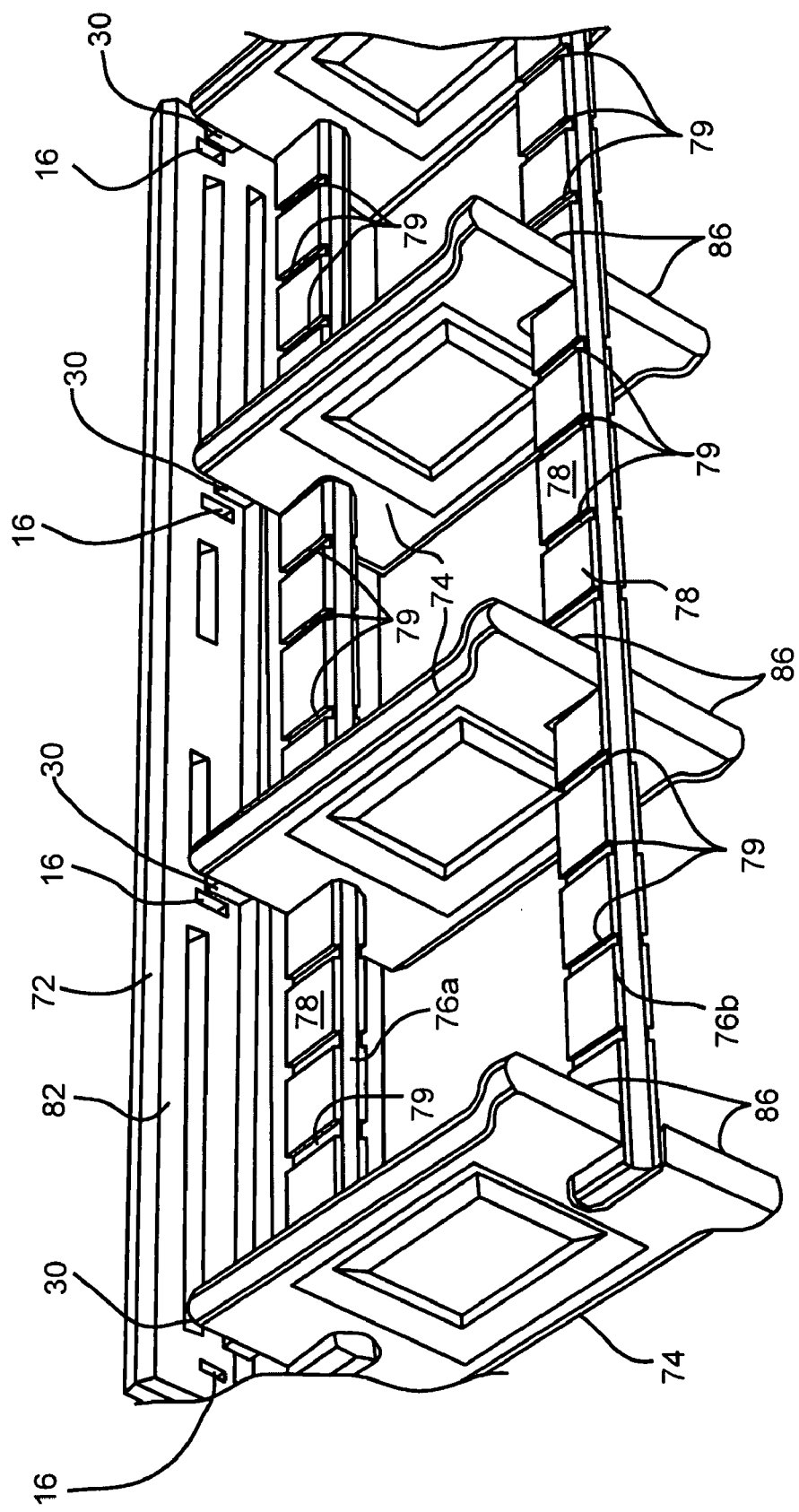
FIG. 19 is a bottom perspective view of the horizontal support member separated from the vertical support members.
Figure 20:
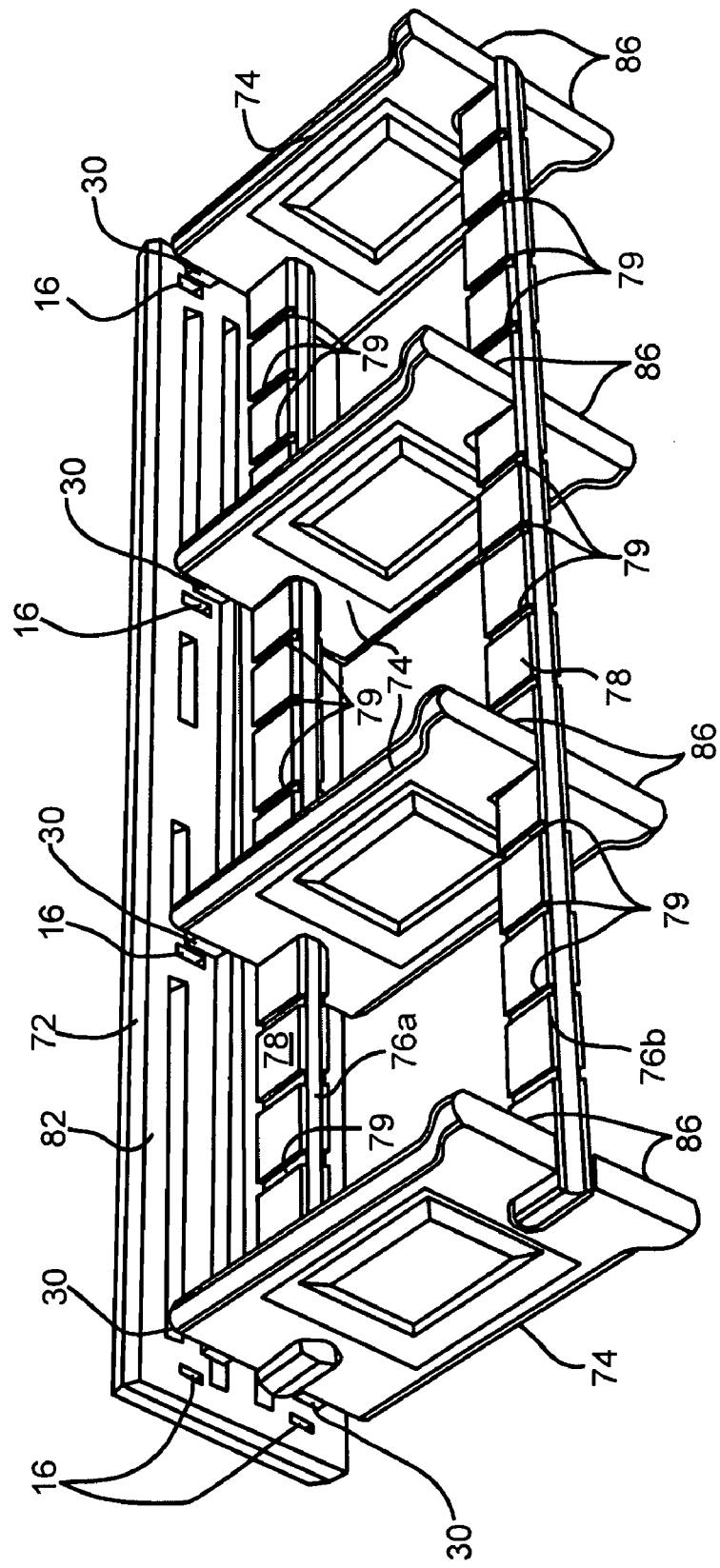
FIG. 20 is a bottom perspective view of the horizontal support member separated a greater distance from the vertical support members than is shown in FIG. 19.
Figure 21:
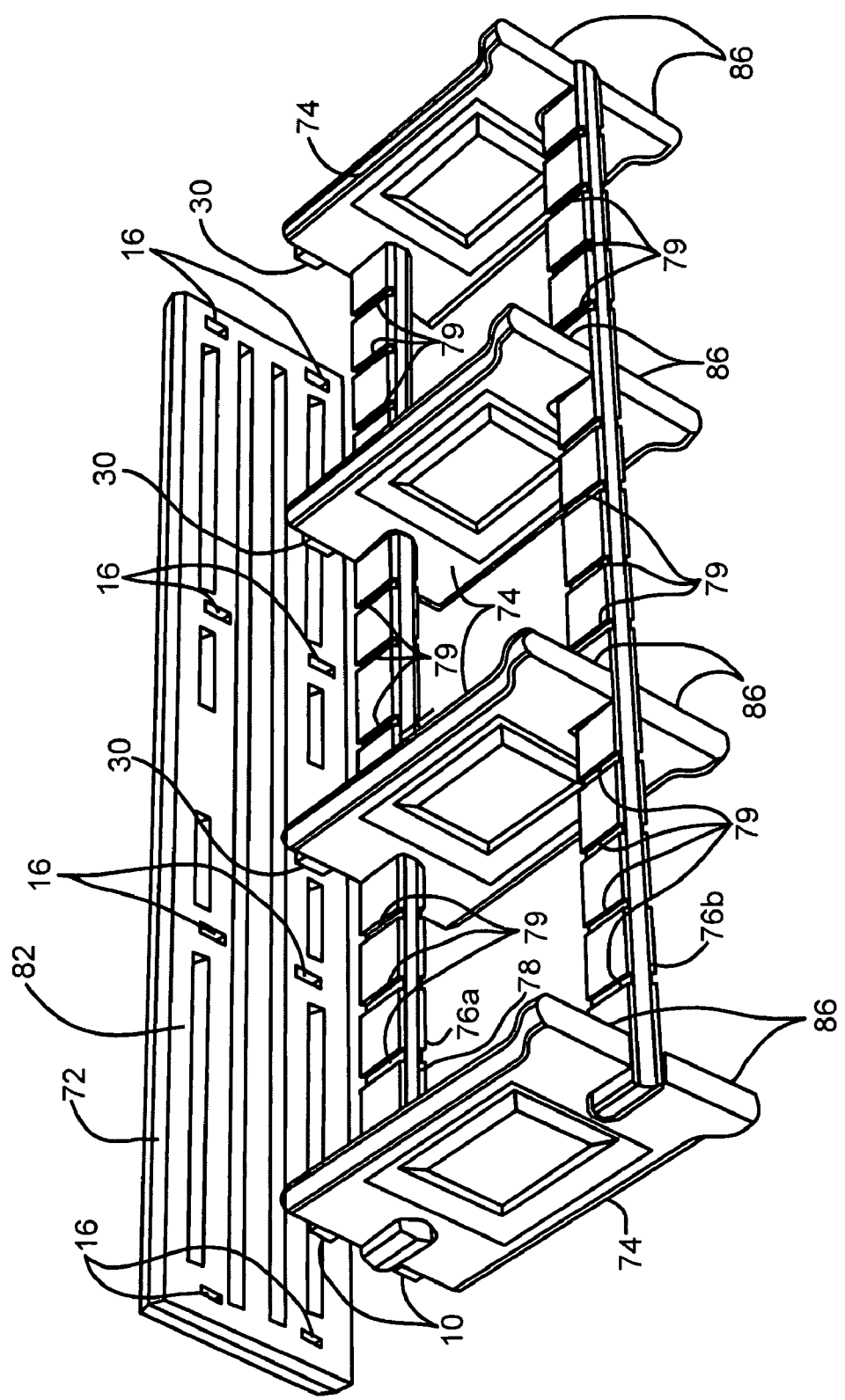
FIG. 21 is a bottom perspective view of the horizontal support member separated from the vertical support members an even greater distance than shown in FIG. 20.
Figure 22:
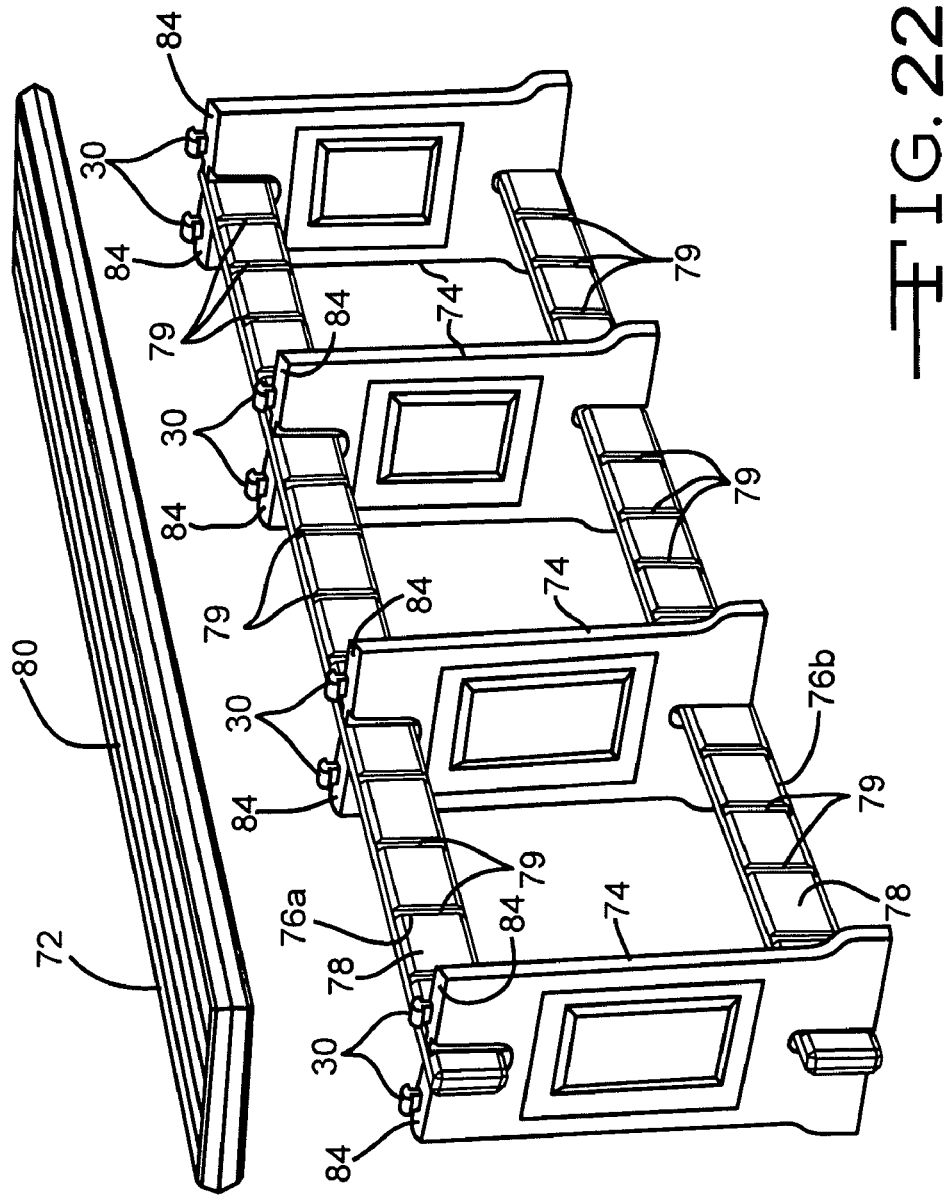
FIG. 22 is a left perspective view of the horizontal support member separated from the vertical support members.
Figure 23:
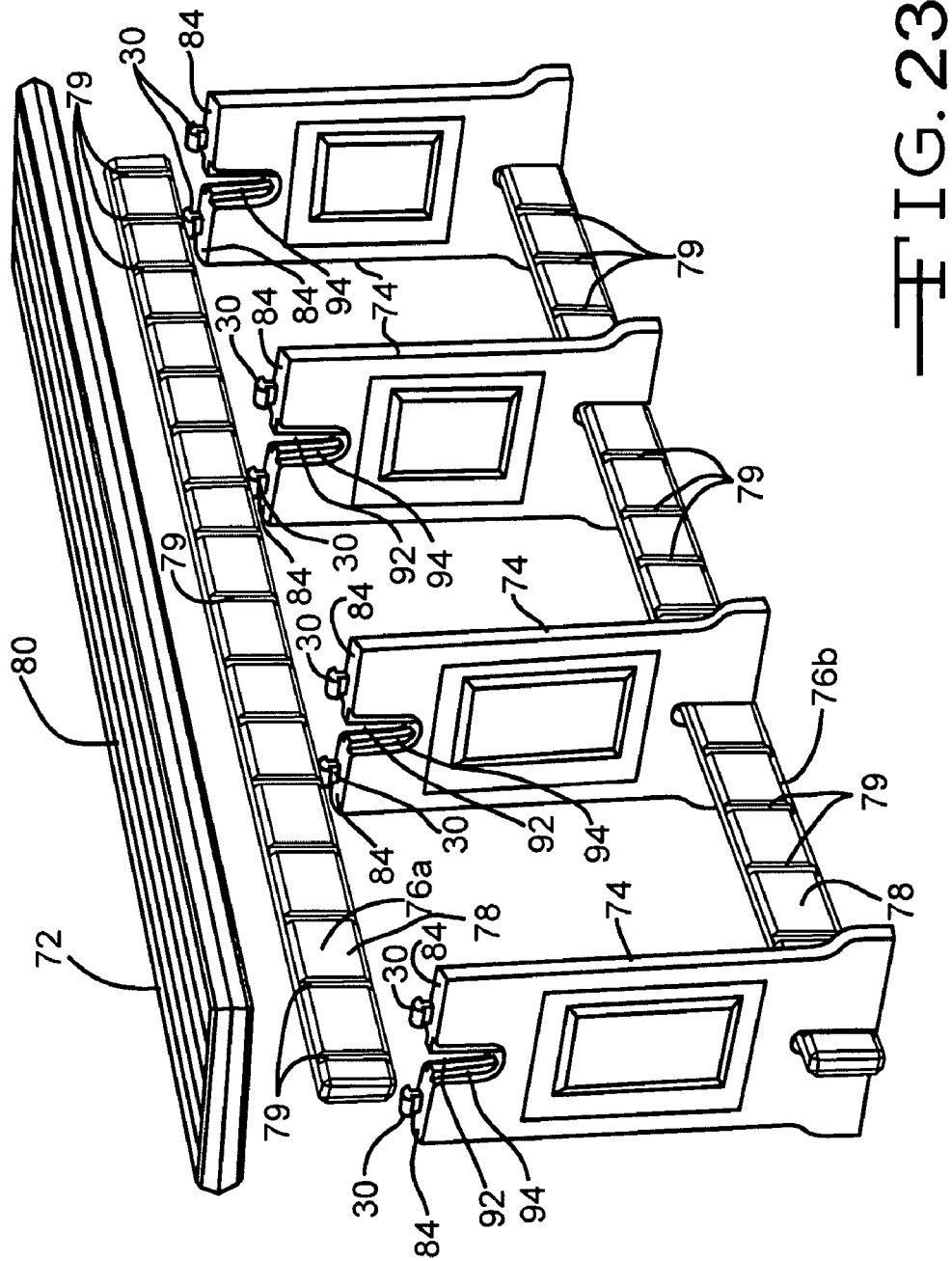
FIG. 23 is a partly exploded view showing the horizontal support member and a first beam separated from the vertical support members.
Figure 24:
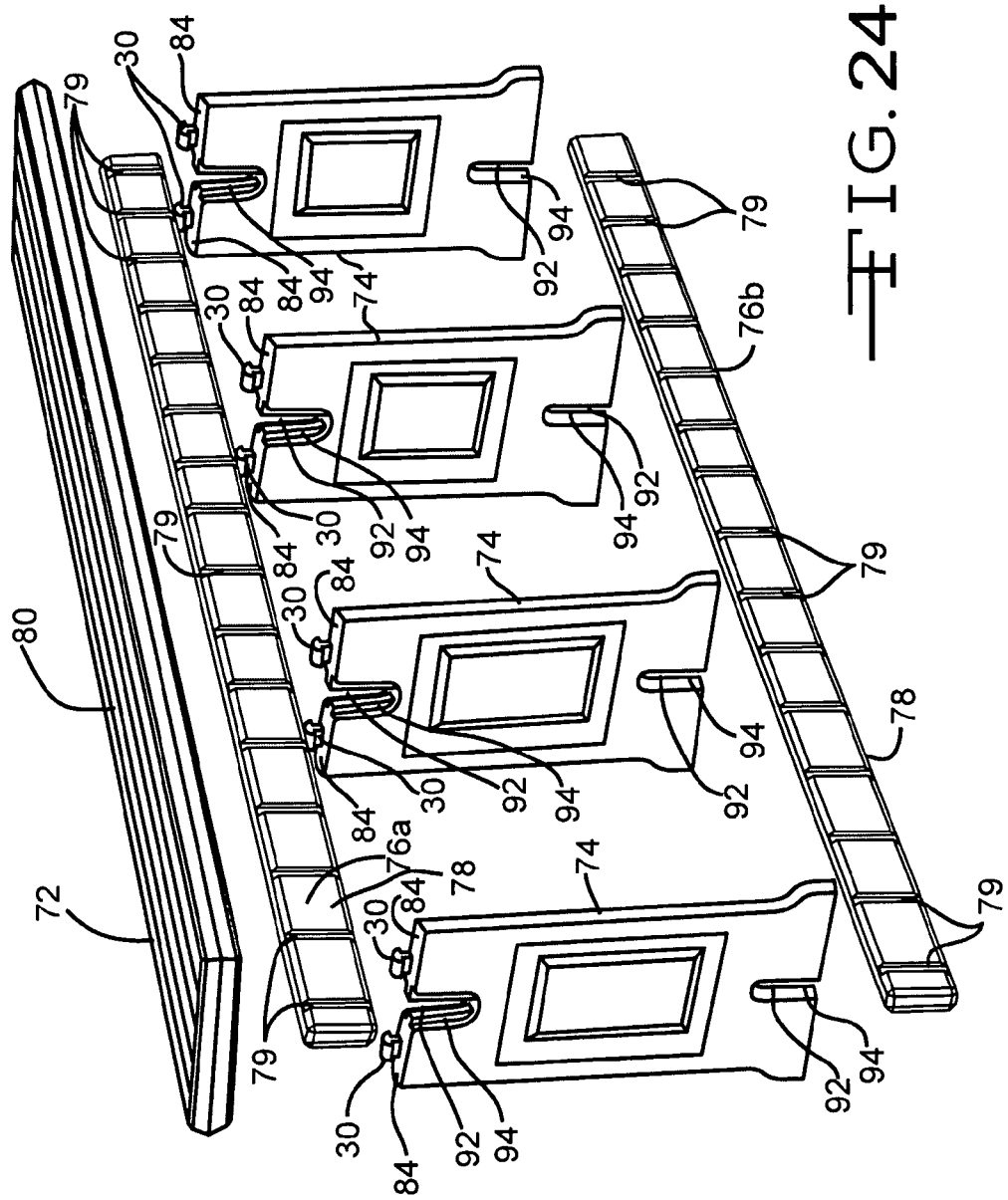
FIG. 24 is an exploded view showing the horizontal support member, vertical support members, and the first and second beams.

FIGS. 17-27 show one of the embodiments of the releasably joinable indented female connector 16 and male connector 30 used to form a structure 46. In particular, shown in FIGS. 17-18 is a structure 46 that can be used as a counter, a table, a bar, a storage surface, a book shelf, or a support for virtually any object(s). Although the structure 46 shown in these drawings could be used for any of a plurality of purposes, structure 46 is, for the sake of convenience, hereinafter referred to as a table 70. The table 70 shown in FIGS. 16 and 17 is constructed from components 68 comprising a horizontal support member 72, a plurality of vertical support members 74, a first beam 76a, and a second beam 76b.

The horizontal support member 72 has a support side 80 and a connector receiving side 82. Formed in the connector receiving side 82 of the horizontal support member 72 are a plurality of spaced apart indented female connectors 16, as shown in FIGS. 18-21. These indented female connectors 16 are fully described above.

The vertical support members 74 each have a male connector side 84 and a base side 86. Spaced apart male connectors 30 extend from the male connector side 84 as shown in FIGS. 18-25. The male connectors 30 are fully described above.

Figure 25:
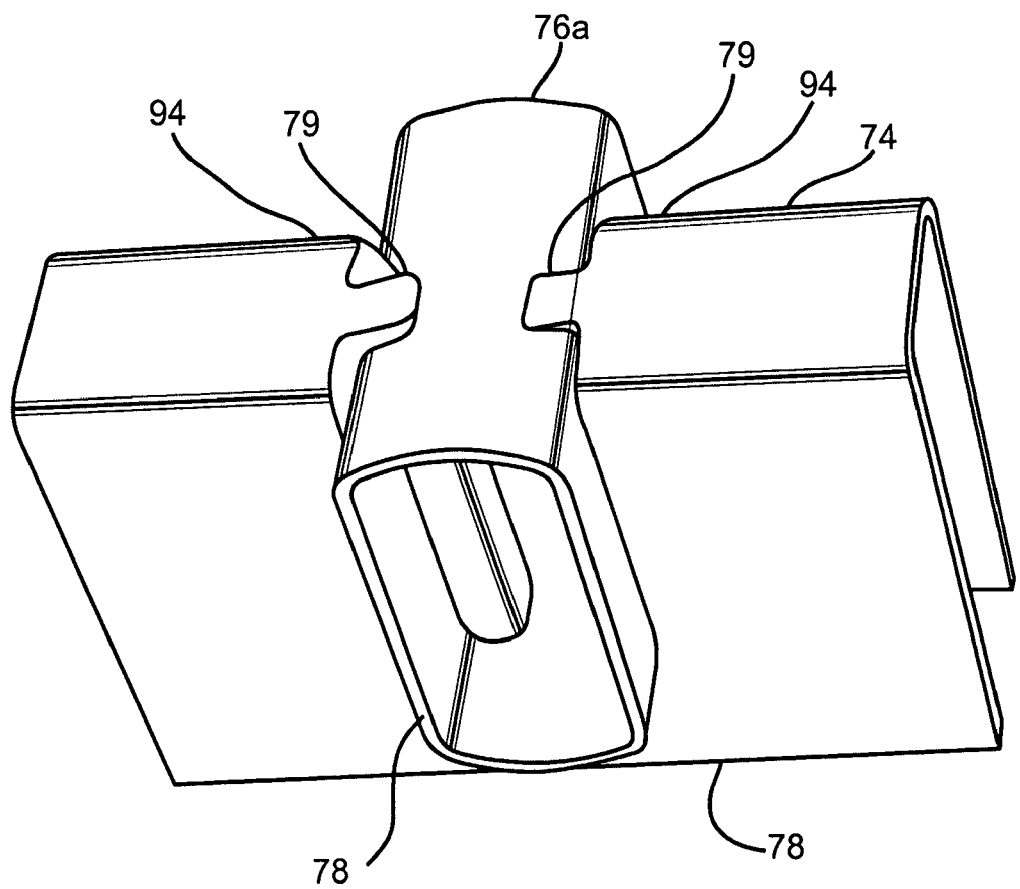
FIG. 25 is a perspective view, partly in section, of the first beam received in one of the vertical support members.
Figure 26:
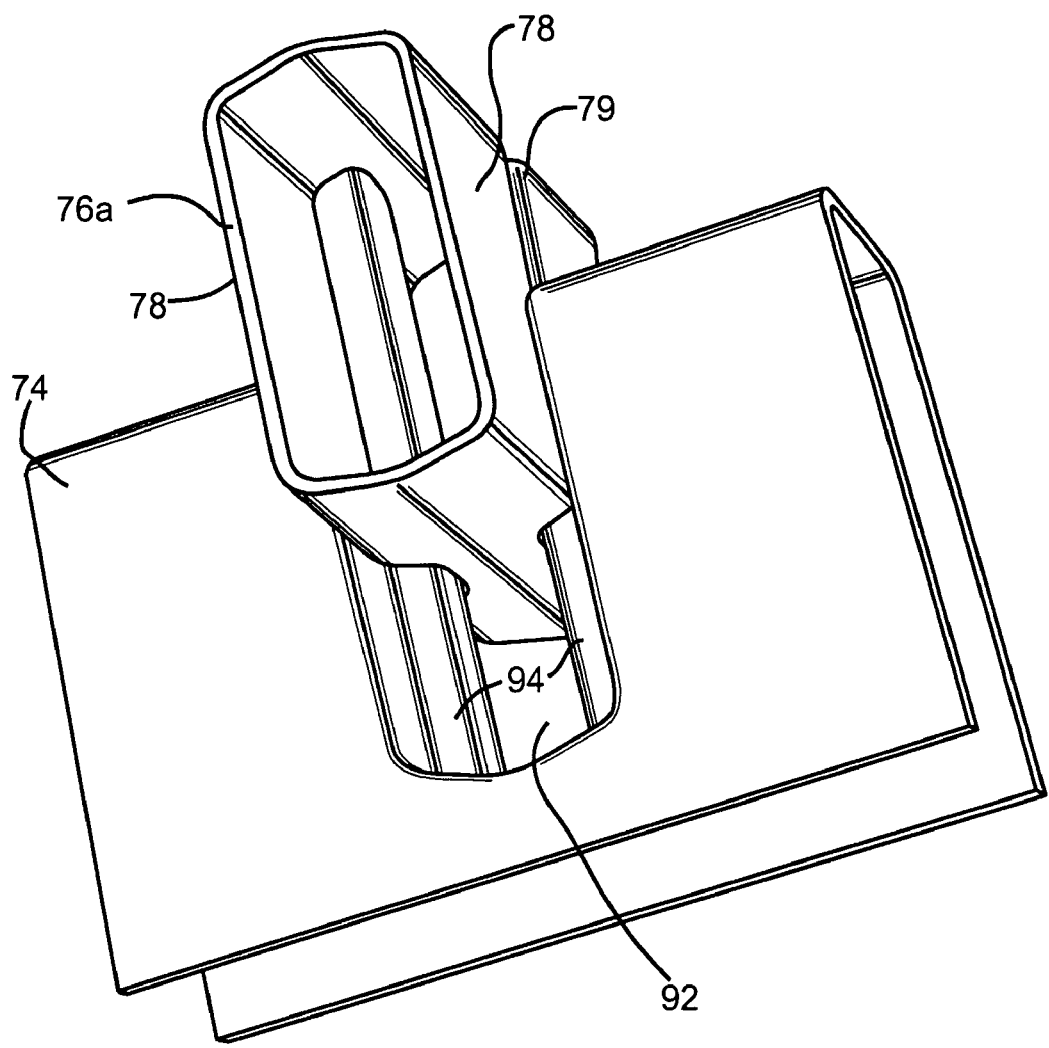
FIG. 26 is a perspective view, partly in section, of the first beam partly received in one of the vertical support members.
Figure 27:
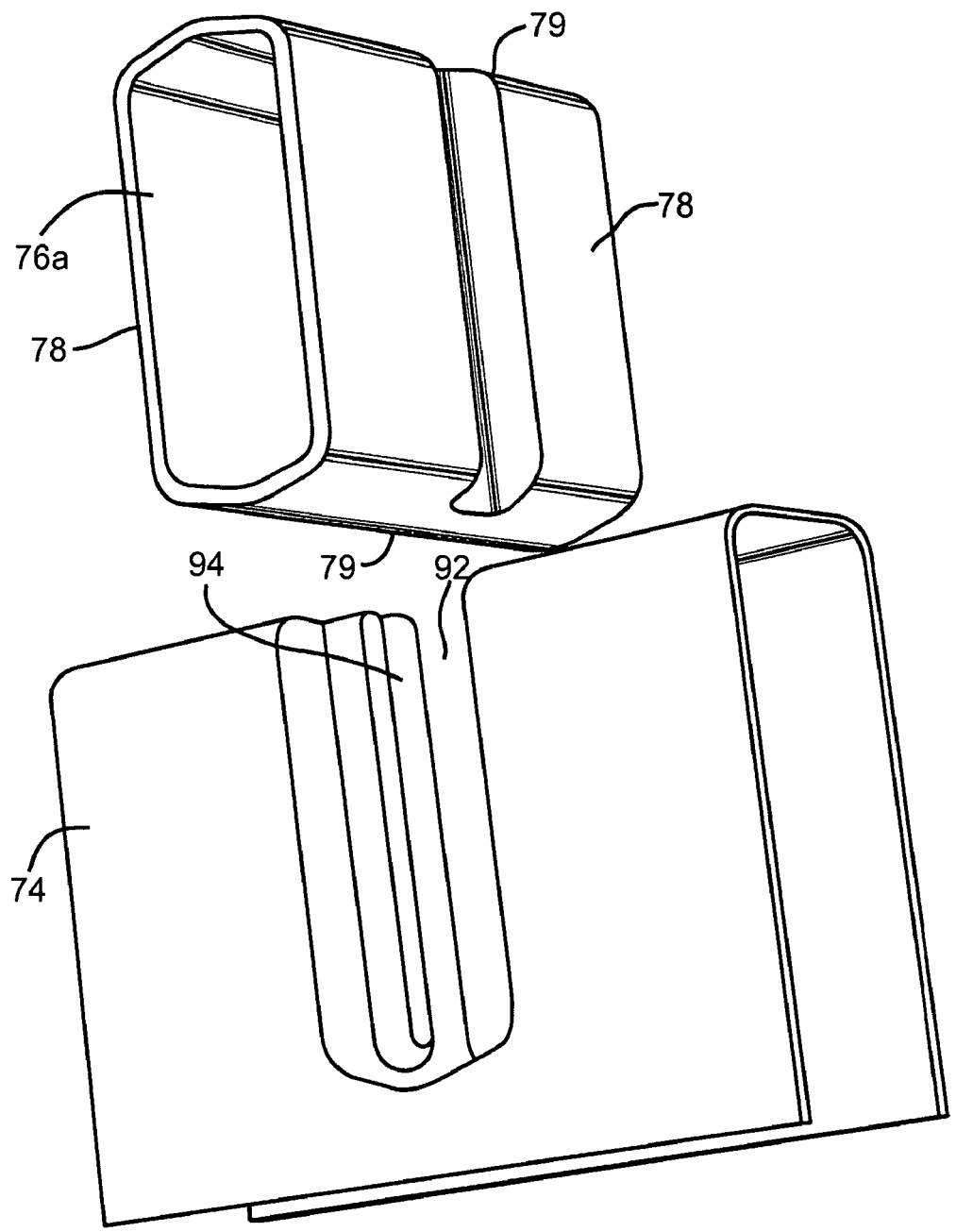
FIG. 27 is a perspective view, partly in section, of the first beam aligned with a recess formed in one of the vertical support members.

The first and second beams, 76a, 76b, respectively, are shown in FIGS. 16-27, and are for providing additional stability to the table 70. Each of the first and second beams 76a, 76b, respectively, has a pair of opposed beam sides 78. Formed in the pair of opposed beam sides 78 are a plurality of spaced apart grooves 79. The grooves 79 are aligned with one another on opposite sides 78 of the first beam 76a and on opposite sides of the second beam 76b, as shown in FIG. 25. The vertical supports 74 have openings 92 formed in them and have guides 94 that extend into the openings 92, as shown in FIGS. 25-27.

The table 70 can be constructed by one person in a matter of minutes from the above-described components without the use of tools, hammers, equipment, and/or other parts or pieces. The first step is to align the first and second beams 76a, 76b, respectively, with the openings 92 defined in the vertical supports 74. Then, the first beam 76a is moved into the openings 92, such that the guides 94 are received in the grooves 70. The first beam 76a and vertical support 74 are held together by a friction fit. The same process is used to join the second beam 76b to the vertical supports 74.

Then, the horizontal support 72 is aligned with the vertical supports 74, such that the indented female connectors 16 formed in the connector receiving side 82 side of the horizontal support 72 are aligned with the male connectors 30 extending from the male connector side 84 of the vertical supports 74. Then, pressure or force is applied to the support side 80 of the horizontal support 72, and the male connectors 30 move into the indented female connectors 16. The male connectors 30 and indented female connectors 16 are joined to one another and a sturdy table 70 is thus formed. Some of the advantages of the table 70 are that no tools were required to assemble the table 70, the completed table 70 is rigid and strong, and that the table 70 can be repeatedly disassembled and reassembled. Disassembly of the table 70 is desirable if the table 70 needs to be stored.

Figure 28:
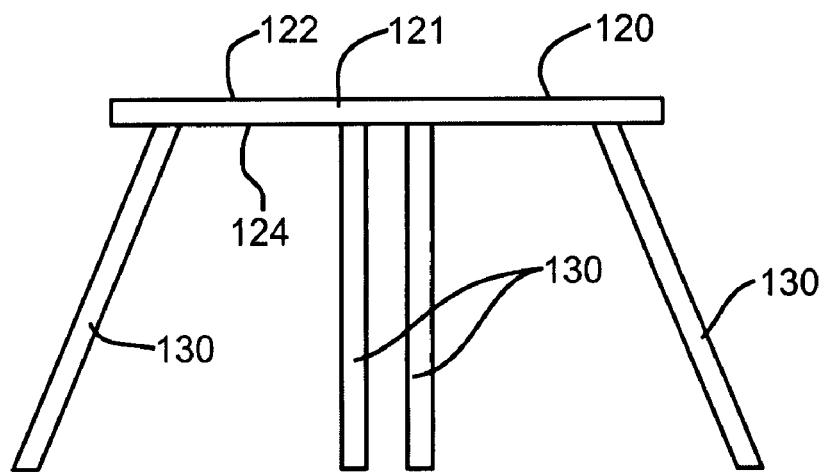
FIG. 28 is a front elevation of a four legged stool.
Figure 29:
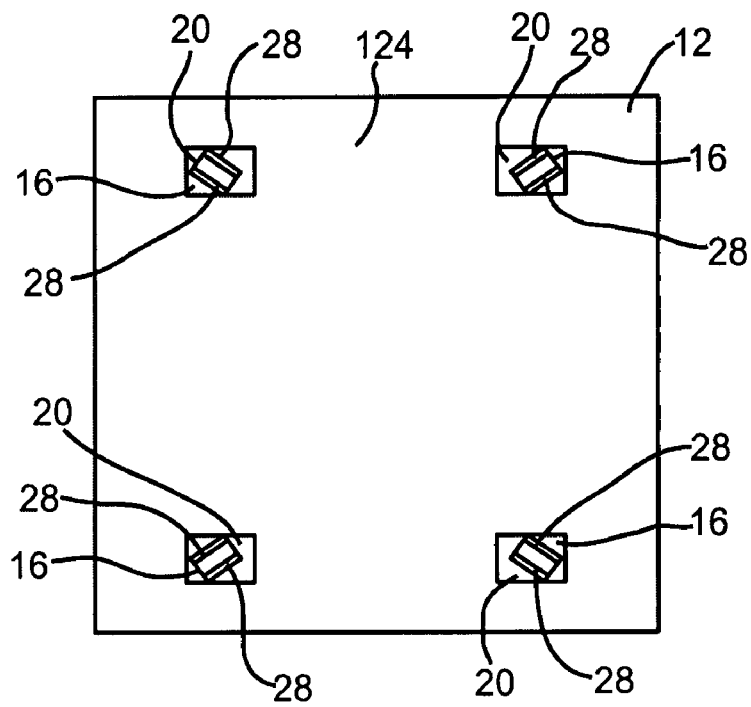
FIG. 29 is a bottom plan view of the seat of the stool.
Figure 30:
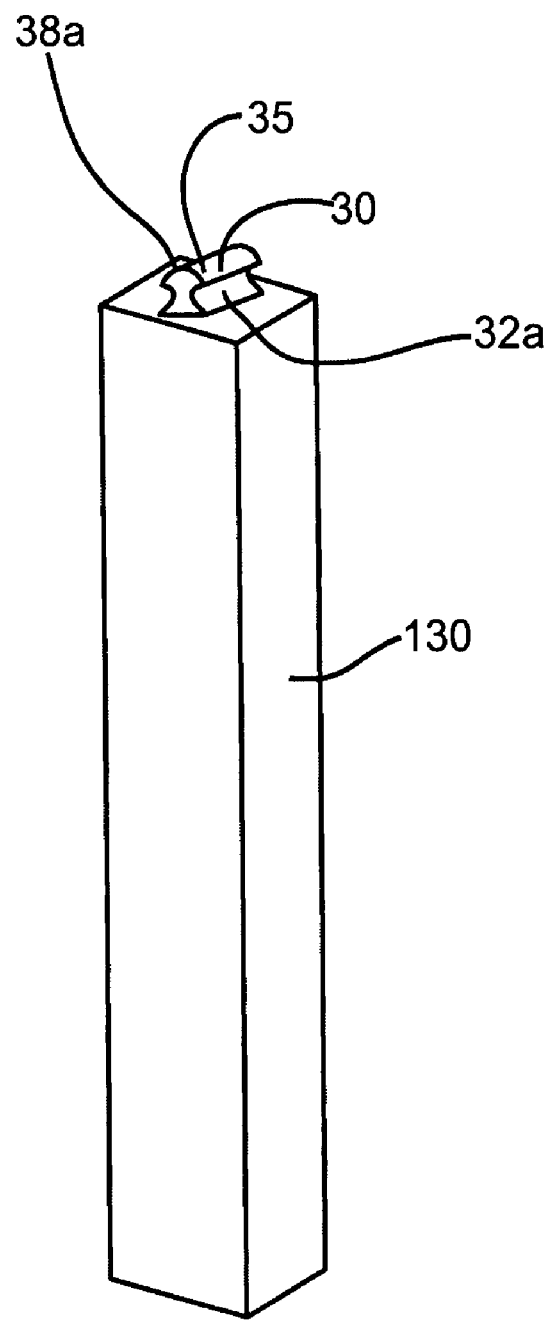
FIG. 30 is a perspective view of a leg of the stool.

In another embodiment, the structure 46 comprises a stool 120 that is held together with male connectors 30 and indented female connectors 16, as shown in FIGS. 28-30. The stool 120 comprises a seat 121 having a load side 122 and a leg side 124. The leg side 124 comprises four indented female connectors 16, as shown in FIG. 29. The indented female connectors 16 are recessed in the leg side 124 of the seat 121. Additionally, the upper or first walls 20 formed in the leg side 124 of the seat 121 that the indented female connectors 16 extend into are angled or sloped with respect to the leg side 124 of the seat 121, such that when legs 130 are joined to the female connectors 16 the legs 130 extend in a direction away from the seat 121. This allows the legs 130 to flare outwardly as shown in FIG. 28, providing for a more stable stool 120.

Figure 31:
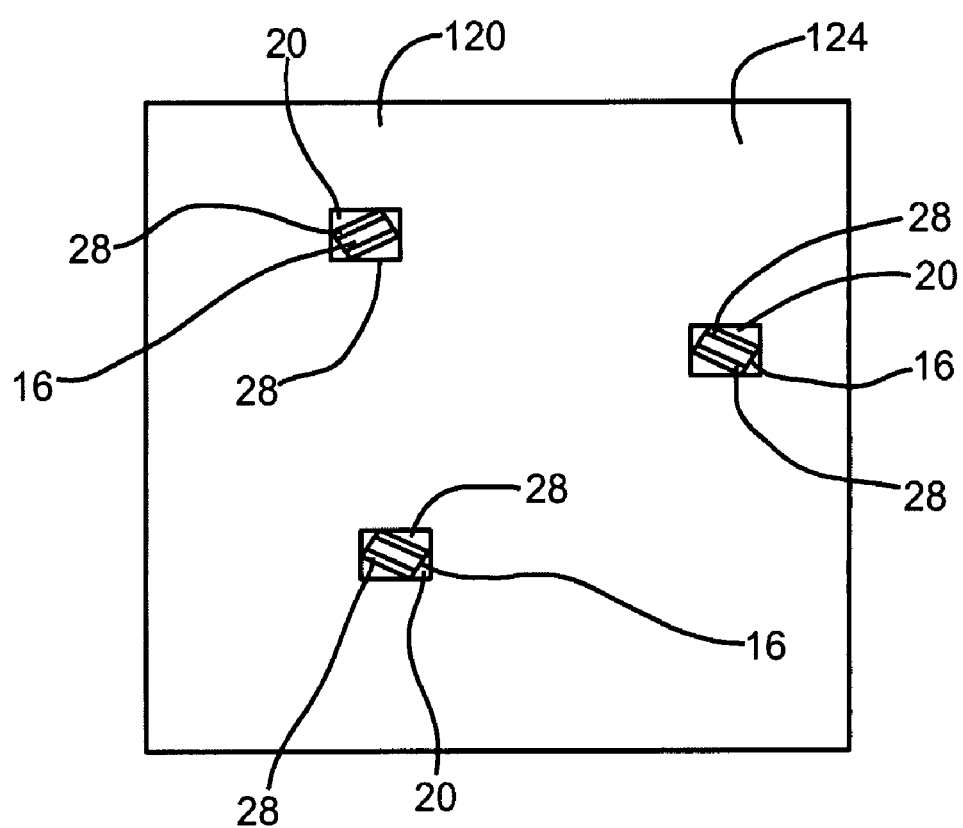
FIG. 31 is a bottom plan view of a three-legged stool.

The legs 130 are each provided with a male connector 30, as shown in FIG. 30, extending from one end thereof. The male connector 30 on each leg 130 is fitted into and joined to one of the indented female connectors 16. The stool 120 is formed when the four legs 130 have each been forced into the indented female connectors 16. One of the advantages of the stool 120 is that no tools, part, pieces, equipment, or loose fasteners were required to assemble the stool 120. Another advantage of the stool 120 is that the stool 120 can be repeatedly manually assembled and disassembled. Another advantage of the stool 120 is that once the male connector 30 on the 130 is fitted into the indented female connector 16, there is little play or room for movement between the two, and a result the stool 120 can support the weight of an adult person without collapsing. In another embodiment, the stool 12 may comprise three legs 120 that spaced at substantially equal distances from one another, as shown in FIG. 31. FIG. 31 shows a bottom plan view of a stool seat that has three indented female connectors 16 for joining to there legs 130.

Thus, a virtually limitless number of structures 46 can be made that make use of the indented female connector 16 and male connector 30. Advantageously, these structures can be manually assembled and disassembled in a short amount of time with the use of tools or other components. More advantages are that these structures 46 are lightweight and can be mass produced at low production costs. Also, these structures 46 are strong and stable, because there is little play or room for movement between the male connector 30 and indented female connector 16 when they are joined together.

There is also a method of making a structure using first and second hollow molded objects, 10, 11, respectively. The method comprises providing the first hollow object 10 with an indented female blow-molded connector comprising 16 having at least one rib 28. Providing the second hollow molded unit with a male connector 30 having first and second contact walls 33a, 33b, respectively, that meet with a curved wall 35 at first and second contact edges 38a, 38b, respectively. The method includes moving the male connector 30 into the indented female connector 16 until the first and second contact edges 38a, 38b, respectively move past the at least one rib 28, thus joining the first and second hollow molded objects, 10, 11, respectively.

While the indented female blow-molded connector and male connector have been described in connection with certain embodiments, it is not intended to limit the scope of the indented female blow-molded connector and male connector to the particular forms set forth, but, on the contrary, it is intended to cover such alternatives, modifications, and equivalents as may be included within the spirit and scope of the indented female blow-molded connector and male connector as defined by the appended claims.

What is claimed:

1. An indented female blow-molded connector comprising:
   a hollow molded object having an upper wall and a plurality of second walls interconnected to form a cavity, the upper wall and second walls each have having an exterior surface and an interior surface, the interior surface is separated from the exterior surface by a thickness of the respective upper wall or second wall, the interior surfaces define the cavity in the hollow molded object, the cavity to contains a fluid, a portion of the exterior surface of the upper wall surrounds an opening having a length;
   inside walls extending substantially perpendicular to the portion of the exterior surface and defining the opening;
   at least one rib extending from one of the inside walls, the at least one rib facing inwardly and that at least one rib extends completely across the length of the opening and a flex section extends between the exterior surface of the upper wall at the edge of the opening and the at least one rib and the flex section has a dimension, the dimension is the length between the exterior surface at the edge of the opening and the at least one rib;
   a bottom joined to the inside walls; and
   the dimension, which is the length between the exterior surface at the edge of the opening and the at least one rib, is greater than the thickness of the upper wall for allowing a male mold component to be removed from the hollow molded object without damaging the at least one rib.

2. The incented female blow-molded connector of claim 1, wherein the hollow molded object is one piece.

3. The indented female blow-molded connector of claim 1, wherein the at least one rib is formed from a pair of walls converging at an approximately forty-five degree angle relative to the one of the inside walls.

4. The indented female blow-molded connector of claim 1, wherein the opening is rectangular.

5. A hollow object comprising:
   an upper wall and a plurality of second walls interconnected to form a cavity, the upper wall and second walls each have having an exterior surface and an interior surface, the interior surface is separated from the exterior surface by a thickness of the respective upper wall or second wall, the interior surfaces define the cavity in the hollow molded object, the cavity to contains a fluid, a portion of the exterior surface of the upper wall surrounding shaped an opening;
   opposed pairs of inside walls joined with the upper wall at the opening and each pair of inside walls extending substantially perpendicular to the upper wall;
   ribs formed in one of the pairs of inside walls in a face to face relationship and the ribs extend along a length of the opening and a flex section extends from the exterior surface of the upper wall at the edge of the opening to the ribs and the flex section has a dimension, the dimension is the length between the exterior surface at the edge of the opening and the at least one rib;
   wherein the dimension, which is the length between the exterior surface at the edge of the opening and the at least one rib, is greater than the thickness of the upper wall for allowing a male mold component to be removed from the hollow object without damaging the at least one rib; and
   wherein the hollow object is one piece.

6. The hollow object of claim 5, wherein the opening is rectangular.

7. An indented female blow-molded connector comprising:
   a hollow object comprising a thermoplastic material having an upper wall having an exterior surface, an interior surface separated from the exterior surface by a thickness of the upper wall, and a plurality of second walls interconnected to the upper wall to form a cavity, each second wall has an exterior surface, an interior surface separated from the exterior surface by a thickness of the respective second wall, and the interior surfaces of the second walls define the cavity in the hollow object, the cavity to contains a fluid, and the upper wall has a circular shaped opening at portions of the exterior surface;
   the hollow object further having an inside wall joined with the upper wall that defines the circular shaped opening and an annular rib extends from the inside wall;

a flex section extends along the inside wall between the annular rib and the exterior surface of the upper wall at the edge of the opening and the flex section has a dimension, the dimension is the length between the exterior surface at the edge of the opening and the annular rib; and wherein the dimension, which is the length between the exterior surface at the edge of the opening and the annular rib, is greater than the thickness of the upper wall to allow a male mold component to be removed from the hollow object without damaging the annular rib.

8. An indented female blow-molded connector, comprising:

a hollow object having an upper wall and a plurality of second walls to form a cavity, the upper wall having an exterior surface and an interior surface separated from the exterior surface by a thickness of the upper wall, each second wall having an exterior surface and an interior surface separated from the exterior surface by a thickness of the second wall, the interior surfaces of the second walls define the cavity in the hollow object, the cavity, to contains a fluid, and the exterior surface of the upper wall surrounding an opening having opposed major lengths;

opposed major length inside walls joined to the upper wall at the opening and opposed minor length inside walls joined to the upper wall at the opening and wherein the opposed major length inside walls are separated by the opposed minor length inside walls;

opposed ribs formed in the opposed major length inside walls and each of tile opposed ribs extends from one of the opposed minor length inside walls to the other of the opposed minor length inside walls;

a flex section extends between the exterior surface of the upper wall at the edge of the opening and the opposed ribs and the flex section has a dimension, the dimension is the length between the exterior surface at the edge of the opening and the opposed ribs;

a section joined to the opposed major length inside walls and joined to the opposed minor length inside walls and the section disposed at a bottom of the indented female blow-molded connector;

wherein the dimension, which is the length between the exterior surface at the edge of the opening and the opposed ribs, is greater than the thickness of the upper wall the opposed ribs of the hollow object are undamaged upon removal of the male mold component from the hollow object, and wherein the hollow object is one piece and a thermoplastic material.

9. The indented female blow-molded connector of claim 8, wherein the opening is rectangular.

* * * * *